US008046438B2

(12) United States Patent
Martinez et al.

(10) Patent No.: US 8,046,438 B2
(45) Date of Patent: Oct. 25, 2011

(54) SYSTEM AND METHOD OF RESTORING DATA AND CONTEXT OF CLIENT APPLICATIONS STORED ON THE WEB

(75) Inventors: Ronald Martinez, San Francisco, CA (US); Karon A. Weber, San Francisco, CA (US); Samantha Tripodi, San Francisco, CA (US); Winton Davies, San Francisco, CA (US); Chris Kalaboukis, Los Gatos, CA (US); Oliver Raskin, Portland, OR (US)

(73) Assignee: Yahoo! Inc., Sunnyvale, CA (US)

( * ) Notice: Subject to any disclaimer, the term of this patent is extended or adjusted under 35 U.S.C. 154(b) by 199 days.

(21) Appl. No.: 11/724,732

(22) Filed: Mar. 16, 2007

(65) Prior Publication Data
US 2008/0228837 A1 Sep. 18, 2008

(51) Int. Cl.
*G06F 15/16* (2006.01)
(52) U.S. Cl. ........ 709/219; 709/203; 709/217; 709/223; 709/246; 715/239
(58) Field of Classification Search .................. 709/203, 709/204, 224, 230, 246, 217–219, 223, 232
See application file for complete search history.

(56) References Cited

U.S. PATENT DOCUMENTS

| 6,421,733 | B1 * | 7/2002 | Tso et al. ........................ 709/217 |
| 6,427,175 | B1 | 7/2002 | Khan et al. |
| 6,952,724 | B2 * | 10/2005 | Prust .............................. 709/219 |
| 7,340,675 | B1 * | 3/2008 | Hancock ........................ 709/204 |
| 7,467,349 | B1 | 12/2008 | Bryar et al. |
| 7,870,272 | B2 * | 1/2011 | Berkowitz et al. ............ 709/219 |
| 2002/0015057 | A1 * | 2/2002 | Park .............................. 709/246 |
| 2002/0046245 | A1 * | 4/2002 | Hillar et al. .................... 709/205 |
| 2003/0005464 | A1 * | 1/2003 | Gropper et al. ............... 709/219 |
| 2004/0193597 | A1 | 9/2004 | Johnson |
| 2006/0212790 | A1 | 9/2006 | Perantatos et al. |
| 2007/0136443 | A1 | 6/2007 | Sah et al. |
| 2007/0156627 | A1 | 7/2007 | D'Alicandro |
| 2007/0162570 | A1 * | 7/2007 | Mathur et al. ................. 709/219 |
| 2007/0209011 | A1 | 9/2007 | Padmanabhuni et al. |
| 2007/0220441 | A1 | 9/2007 | Melton et al. |
| 2007/0300160 | A1 | 12/2007 | Ferrell et al. |

(Continued)

OTHER PUBLICATIONS

D. R. Millen et al., "Dogear: Social Bookmarking in the Enterprise", CHI 2006 Proceedings, Social Computing 1, Apr. 22-27, 2006, pp. 111-120.

(Continued)

*Primary Examiner* — Ramy M Osman
(74) *Attorney, Agent, or Firm* — Buchenhorner Patent Law

(57) ABSTRACT

An improved system and method for supporting web system services is provided for storing data and context of client applications on the web. A client application may include a web system services interface for invoking web system services to support web applications to operate over the web using different devices that may store data and context of web applications as a web application document onto a web server. A web application document may be represented by components that may include view information, content, and context information. The application may also include a web system services user interface for providing a graphical user interface for a user to invoke web system services that may include a new document system service, a store document system service, and a restore document system service. A schema for context scope may be implemented for collecting context information relevant to the web application document.

16 Claims, 20 Drawing Sheets

U.S. PATENT DOCUMENTS

| | | | |
|---|---|---|---|
| 2008/0031003 | A1 | 2/2008 | Velarde |
| 2008/0046845 | A1 | 2/2008 | Chandra |
| 2008/0072141 | A1 | 3/2008 | Hodel-Widmer |
| 2008/0086471 | A1 | 4/2008 | Ritter et al. |
| 2008/0109881 | A1 | 5/2008 | Dasdan |
| 2008/0147483 | A1 | 6/2008 | Ji |
| 2008/0228806 | A1 | 9/2008 | Davies et al. |
| 2008/0228807 | A1 | 9/2008 | Davies et al. |
| 2008/0228903 | A1 | 9/2008 | Davies et al. |
| 2008/0229241 | A1 | 9/2008 | Davies et al. |
| 2008/0229251 | A1 | 9/2008 | Davies et al. |
| 2008/0282198 | A1 | 11/2008 | Brooks et al. |

OTHER PUBLICATIONS

R. M. Keller et al., "A bookmarking service for organizing and sharing URLs", 1997, Computer Networks and ISDN Systems 29 (1997), pp. 1103-1114.

USPTO; *Office Action*; U.S. Appl. No. 11/724,716, filed Mar. 16, 2007, in the name of Davies et al; 10 pgs, mailed Feb. 25, 2009.

USPTO; *2nd Final Office Action*; U.S. Appl. No. 11/724,716, filed Mar. 16, 2007, in the name of Davies et al; 7 pgs, mailed Jan. 12, 2010.

USPTO; *Office Action*; U.S. Appl. No. 11/724,719, filed Mar. 16, 2007, in the name of Davies et al; 9 pgs, mailed Jan. 6, 2009.

USPTO; *Final Office Action*; U.S. Appl. No. 11/724,719, filed Mar. 16, 2007, in the name of Davies et al; 5 pgs, mailed May 26, 2009.

USPTO; *2nd Final Office Action*; U.S. Appl. No. 11/724,719, filed Mar. 16, 2007, in the name of Davies et al; 7 pgs, mailed Mar. 8, 2010.

USPTO; *Office Action*; U.S. Appl. No. 11/724,730, filed Mar. 16, 2007, in the name of Davies et al; 8 pgs, mailed Jan. 8, 2009.

USPTO; *Final Office Action*; U.S. Appl. No. 11/724,730, filed Mar. 16, 2007, in the name of Davies et al; 5 pgs, mailed May 27, 2009.

USPTO; *2nd Final Office Action*; U.S. Appl. No. 11/724,730, filed Mar. 16, 2007, in the name of Davies et al; 6 pgs, mailed Nov. 13, 2009.

USPTO; *Office Action*; U.S. Appl. No. 11/724,718, filed Mar. 16, 2007, in the name of Davies et al; 16 pgs, mailed Sep. 25, 2009.

USPTO; *Final Office Action*; U.S. Appl. No. 11/724,718, filed Mar. 16, 2007, in the name of Davies et al; 17 pgs, mailed Apr. 29, 2010.

USPTO; *Office Action*; U.S. Appl. No. 11/724,716, filed Mar. 16, 2007, in the name of Davies et al; 10 pgs, Notification Date Jul. 22, 2010.

USPTO; *Final Office Action*; U.S. Appl. No. 11/724,730, filed Mar. 16, 2007, in the name of Davies et al; 8 pgs, Notification Date Jul. 23, 2010.

USPTO; *Office Action*; U.S. Appl. No. 11/724,719, filed Mar. 16, 2007, in the name of Davies et al; 7 pgs, Notification Date Jul. 23, 2010.

\* cited by examiner

SYSTEM AND METHOD OF RESTORING DATA AND CONTEXT OF CLIENT APPLICATIONS STORED ON THE WEB

CROSS-REFERENCE TO RELATED APPLICATIONS

The present invention is related to the following United States patent application, filed concurrently herewith and incorporated herein in its entirety:

"System and Method for Providing Web System Services for Storing Data and Context of Client Applications on the Web," U.S. patent application Ser. No. 11/724,719;

"System and Method of Providing Context Information for Client Application Data Stored on the Web," U.S. patent application Ser. No. 11/724,716;

"System and Method of Storing Data and Context of Client Applications on the Web," U.S. patent application Ser. No. 11/724,730;

"System and Method of Providing a User Interface for Client Applications to Store Data and Context Information on the Web," U.S. patent application Ser. No. 11/724,718; and "System and Method of Serving Advertisements for Web Applications," U.S. patent application Ser. No. 11/724,717.

FIELD OF THE INVENTION

The invention relates generally to computer systems, and more particularly to an improved system and method for providing web system services for storing data and context of client applications on the web.

BACKGROUND OF THE INVENTION

Web users are increasingly conducting their personal and professional lives online by using a variety of different applications and devices to provide functionality for communications, scheduling activities, searching and retrieving information, creating and sharing information and content, and many other applications. A variety of applications and information formats like wikis, blogs, video and audio editors, and personal social networking pages provide increasing capability of users to create and share information. Users may create any number of documents that may be shared by reference to a network location or may be sent as an encapsulated document to another user via email. For example, users might move from creating daily blog posts or myspace profiles to creating sales presentations, business reports, multimedia entertainment works, non-fiction works, or "electronic books" containing multiple media items of varying formats.

Unfortunately, there fails to be any consistent set of services supporting an arbitrary set of applications that may be used on the web and that may store content on the web accessible by any of the applications. An online user may be able to receive news headlines from RSS feeds but may not be able to store the headline news stories on the web and later access the text messages using a text-to-speech application to listen to the news headlines from a mobile device. Or an online user may be able to send and receive email attachments using client-server based email systems connected over the web, but may not be able to access the content of the attachments using a text editor executing on a handheld device. Similarly, an online user may receive a video conferencing broadcast over the web, but may not be able to store the video conference on the web and later access the video conference from storage on the web using a streaming media application on an IP video phone.

Although there may be a variety of applications commercially available for creating and storing a web page on a client computer or creating and storing a web page on a web page server, there fails to be a data and storage model for a client to create a content file on a client device and to store the content file on the web where it may be accessible by a variety of web-based applications executing on different devices. HTML-style web pages, for instance, fail to support inclusion of such varied forms of context that may be accessible by a variety of web-based applications. What is needed is a system and method that may implement a data and storage model that may accommodate an otherwise varied set of document types, applications, and device configurations so that an online user may seamlessly store and retrieve content ubiquitously using any device connected to the web.

SUMMARY OF THE INVENTION

Briefly, the present invention may provide a system and method for providing web system services. In various embodiments, a client having an application may be operably coupled by a network to one or more servers such as an identity authentication server, a web application server, and/or a web server. An application, such as a web browser, may execute on the client computer and may include functionality for providing an interface, such as a web system services interface, for invoking web system services to support web applications to operate over the web using different devices that may store data and context of web applications as a web application document onto a web server. A web application document may be represented by components that may include view information, content, and context information. The application may also include a web system services UI for providing a graphical user interface for a user to invoke web system services, a context information monitor for monitoring and collecting context information to be incorporated into a web application document, a content parser for parsing content from an application for inclusion in a web application document, and a content loader for loading content from a web application document saved on the web into the application operating on the client.

The identity authentication server may provide functionality as a web service for authenticating the identity of a user associated with a web application server. The identity authentication server may be operably coupled to identity information storage which may store user information, including for example, a user identification, a password, an email address, and so forth. The web application server may include web system services for supporting web applications to store data and context as a web application document on operably coupled storage. For instance, the web system services may include new document system service, a store document system service, and a restore document system service. The new document system service may provide functionality for creating a web application document including content and context for use by many different web applications, including the web application used to input the content, operating on different devices. The store document system service may provide functionality for storing a web application document on a web server accessible by a user connected to the web server by any number of different devices. The restore document system service may provide functionality for restoring the content and context of a web application document for a web application operating on different devices.

The present invention may also provide a graphical user interface for invoking a web system service for storing client application data and context as a web application document on a web server. An implementation of a user interface menu, web system services interface code and associated programmatic functionality may be dynamically loaded when a client may request authentication of a user. In various embodiments, part or all of the executable code may be loaded from client storage, or part or all of the executable code may be loaded in various other embodiments from a web application server via the network. A client application may request a web system service to be performed on a web application document using the implementation of the user interface menu, web system services interface code and associated programmatic functionality. For example, an application on a client device, such as a web browser, may display a drop-down menu of web system service operations that may be performed on web application documents. Such web system service operations may include New, Open, Close, Save, Save As, Restore, and so forth. A web browser may display a drop-down menu of web system service operations that may be performed on web application documents. Such web system service operations may include New, Open, Close, Save, Save As, Restore, and so forth.

A user may request web system services to be performed to create and then to store a web application document on a web application server. To do so, a user may create a new web application document in the client application by selecting New in the web application menu to invoke web system services interface code that may create a new web application document. The user may then add content to the document, such as an image or text, and then save the web application document by selecting Save in the web application menu to save the web application document on the web. In an implementation, the web application document may be transmitted though a network to a web application server, which may write the web application document into a named "folder" or section of a hard drive. If a user may wish to review a web application document or to create a new one, a conventional web server may be accessed in an embodiment by a client.

Or an application, such as a web browser, may be executing on a client that may display the contents of a web page retrieved from a web server. By selecting Save in the drop-down menu, the user may request that the content in the web page be stored in a web application document on the web. A Save screen may also display selectable options for a user to specify parameters of the information to be saved in a web application document. For instance, parameters may be specified to indicate whether the view information should be stored into the web application document, whether the content of a client application file should be stored into the web application document, and whether the context information related to a client application file should be stored into the web application document. A context scope declaration schema may be provided for collecting context information and the context scope declaration may be represented as a logical schema of elements including a field of view, a time, relevance criteria, entries to return, and who may be associated with the relevant information. Furthermore, the amount of context information for elements of the context information schema may be selectable for customizing the context information preserved in the web application document.

A user may also restore a web application document in an application operating on a client by selecting Restore in the web application menu to invoke a web system service interface for restoring the web application document. The web system service may then be performed on the client by requesting the content of a web application document to be loaded from the web into the application using the context stored in the web application document. After the content of the web application document may be loaded in the application, the content may be modified by the application.

Advantageously, a user may select the amount of context information to store about the web application document as well as specify keywords to be associated with the web application document. Importantly, the present invention implements a data and storage model that may accommodate an otherwise varied set of document types and configurations by providing consistent services across an arbitrary set of applications. Other advantages will become apparent from the following detailed description when taken in conjunction with the drawings, in which:

DETAILED DESCRIPTION

Exemplary Operating Environment

Figure 1:
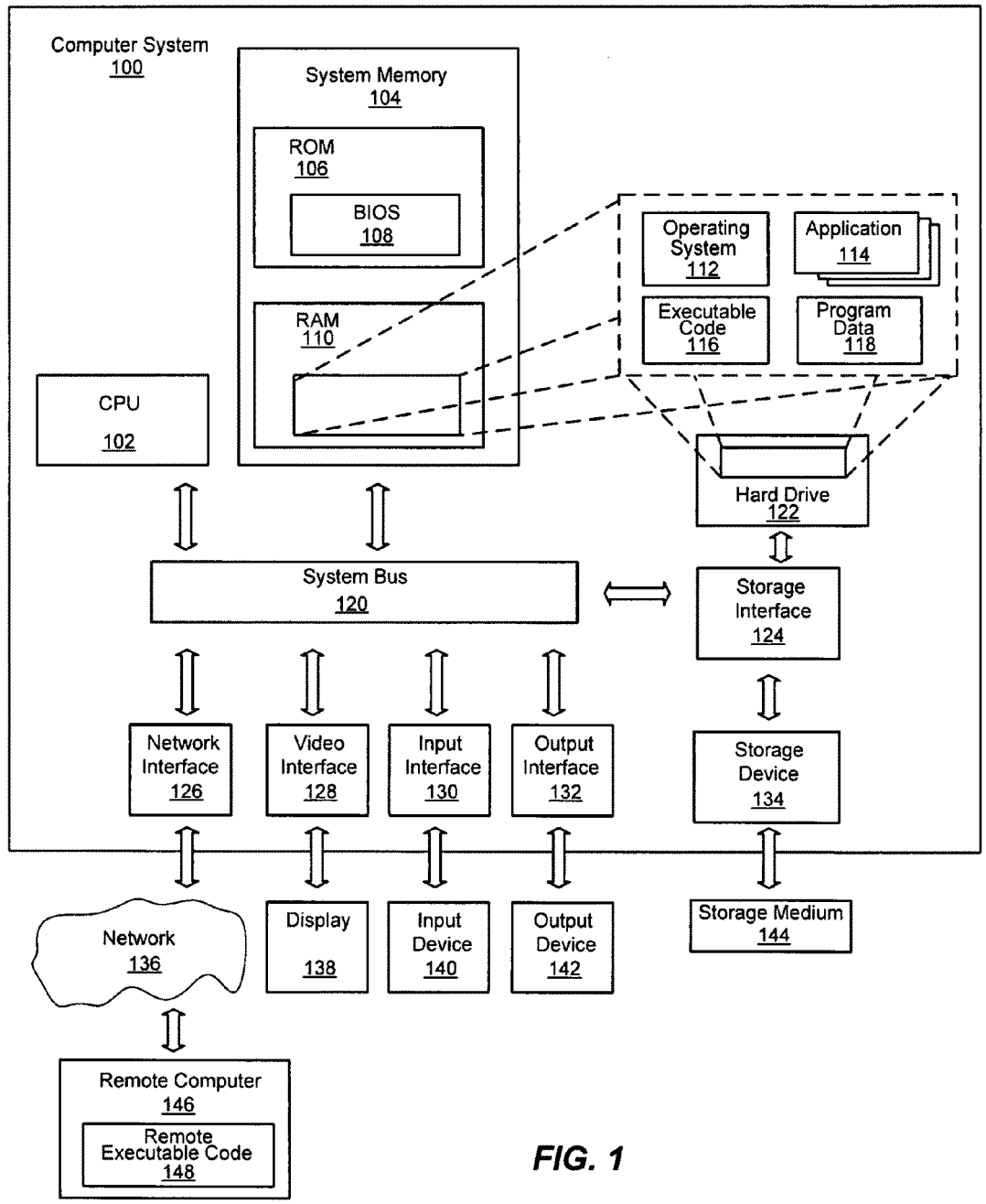
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Web System Services for Storing Data and Context of Client Applications on the Web The present invention is generally directed towards a system and method for providing web system services for supporting web applications to operate over the web using different devices that may store data and context of web applications as a web application document onto web servers. As used herein, a web system service may mean to perform an operation on a web application document that may include data and context stored on the web for creating, storing or restoring a web application document. In addition to storing content for users on the web, enhanced context and related information may be saved along with the content. Accordingly, a user may select the amount of context information to store about the web application document as well as specify keywords to be associated with the web application document. In general, context may mean information related to the web application document that may be either inferred or declared. Advantageously, the scope of context may be varied by a user so that either more or less contextual information of a given type may be saved as part of the web application document.

As will be seen, the present invention may implement a data and storage model that may accommodate an otherwise varied set of document types and configurations by providing consistent services across an arbitrary set of applications. Moreover, information stored using the web systems services may be made generally available for retrieval by web applications other than those that stored the information. As will be understood, the various block diagrams, flow charts and scenarios described herein are only examples, and there are many other scenarios to which the present invention will apply.

Figure 2:
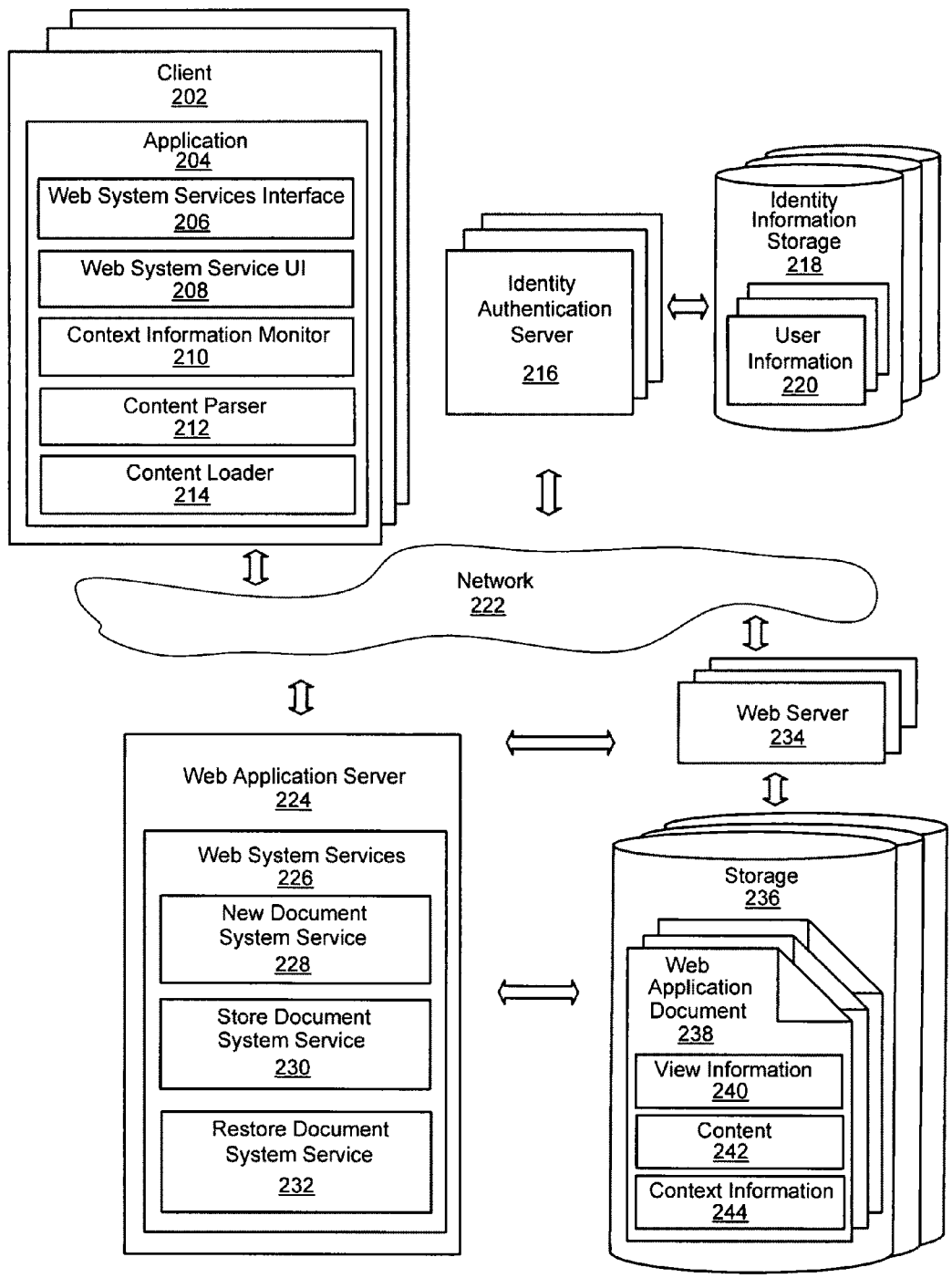
FIG. 2 is a block diagram generally representing an exemplary architecture of system components for supporting web applications to operate over the web using different devices that may store data and context of web applications as a web application document onto web servers, in accordance with an aspect of the present invention.

Turning to FIG. 2 of the drawings, there is shown a block diagram generally representing an exemplary architecture of system components for supporting web applications to operate over the web using different devices that may store data and context of web applications as a web application document onto web servers. Those skilled in the art will appreciate that the functionality implemented within the blocks illustrated in the diagram may be implemented as separate components or the functionality of several or all of the blocks may be implemented within a single component. For example, the functionality for the identity authentication server 216 may be included in the web application server 224. Or the functionality of the content loader 214 may be may be implemented as a separate component from the application 204. Moreover, those skilled in the art will appreciate that the functionality implemented within the blocks illustrated in the diagram may be executed on a single computer or distributed across a plurality of computers for execution.

In various embodiments, a client computer 202 may be operably coupled by a network 222 to one or more servers such as identity authentication server 216, web application server 224, and/or web server 234. The client computer 202 may be a computer such as computer system 100 of FIG. 1. The network 222 may be any type of network such as a local area network (LAN), a wide area network (WAN), or other type of network. An application 204, such as a web browser, may execute on the client computer 202 and may include functionality for providing an interface, such as web system services interface 206, for invoking web system services to support web applications to operate over the web using different devices that may store data and context of web applications as a web application document onto a web server. The application may also include a web system services UI 208 for providing a graphical user interface for a user to invoke web system services, a context information monitor 210 for monitoring and collecting context information to be incorporated into a web application document, a content parser 212 for parsing content from an application for inclusion in a web application document, and a content loader 214 for loading content from a web application document 238 saved on the web into the application 204 operating on the client 202. The application 204, the web system services UI 208, the context information monitor 210, the content parser 212, and the content loader 214 may be any type of interpreted or executable software code such as a kernel component, an application program, a script, a linked library, executable controls, an object with methods, and so forth. The web system services interface 206 may be any implementation of application programming interfaces (APIs) that may invoke web system services. For example, functionality for the web system services interface may be implemented on a browser toolbar using client-related code of the type commonly used in browser plug-ins, such as C++. Or it may be developed using a combination of technologies such as Javascript that may be executed locally, asynchronous access to a server through use of XMLHttpRequest, and/or a Javascript object available for execution by the web browser. For example, there may be a bookmarklet that may include a program such as a JavaScript application that may directly connect from the web page to a database to add user-generated metadata and page content.

The identity authentication server 216 may be a computer, such as computer system 100 of FIG. 1, and may provide functionality as a web service for authenticating the identity of a user associated with a web application server 224. The identity authentication server 216 may be operably coupled to identity information storage 218 which may store user information 220, including for example a user identification, a password, an email address, and so forth. In an embodiment, the functionality of the identity authentication server 216 for authenticating the identity of a user associated with a web application server 224 may be implemented as a component of the web application server 224 rather than implemented as a web service as illustrated in FIG. 2. Moreover, the identity authentication server 216 may be directly coupled to the web application server 224 in a configuration instead of operating as a web service accessible via network 222.

The web application server 224 may include web system services 226 for supporting web applications to store data and context as a web application document 238 on operably coupled storage 236. The web system services 226 may include new document system service 228, a store document system service 230, and a restore document system service 232. The new document system service 228 may provide functionality for creating a web application document including content and context for use by many different web applications, including the web application used to input the content, operating on different devices. The store document system service 230 may provide functionality for storing a web application document on a web server accessible by a user connected to the web server by any number of different devices. The restore document system service 232 may provide functionality for restoring the content and context of a web application document for a web application operating on different devices.

The web application server 224 may also be operably coupled to a web server 234 that may store a web application document 238 on operably coupled storage 236. A web application document 238 may include view information 240, content 242, and context information 244. The web server 234 may be accessed in an embodiment by a client 202 to retrieve a web application document 238 or to create a new one. The web server 234 may pass control to the web application server 224 or obtain relevant information from the web application server 224 and transmit the information through a network 222 to an application 204 operating on a client computer 202.

In general, the web system services may implement a data and storage model that may accommodate an otherwise varied set of document types and configurations by providing consistent services across an arbitrary set of applications from office productivity tools, including a word processor, a spreadsheet application, and a presentation builder, to creativity programs such as audio or video mixers, blogs or site builders. To do so, web system services may allow the web to provide primary storage for information rather than client hard drives. In addition to storing content for users on the web, enhanced context and related information may be saved along with the content. Furthermore, view information may be saved that provides information about the organization structure determining presentation to user, such as HTML or Cascading Style Sheet (CSS) declarations. Information stored using the web systems services Save function may be made generally available for retrieval by web applications other than those that stored the information. Furthermore, privacy controls may additionally be implemented for sharing such enriched documents with other users. In addition to saving content, context information and view information, those skilled in the art will appreciate that one or more instances of content may be captured as well. For example, instances of content presented on a dynamic web page such as news may be progressively saved so that users may scan the instances of content to review top news stories of interest.

Figure 3:
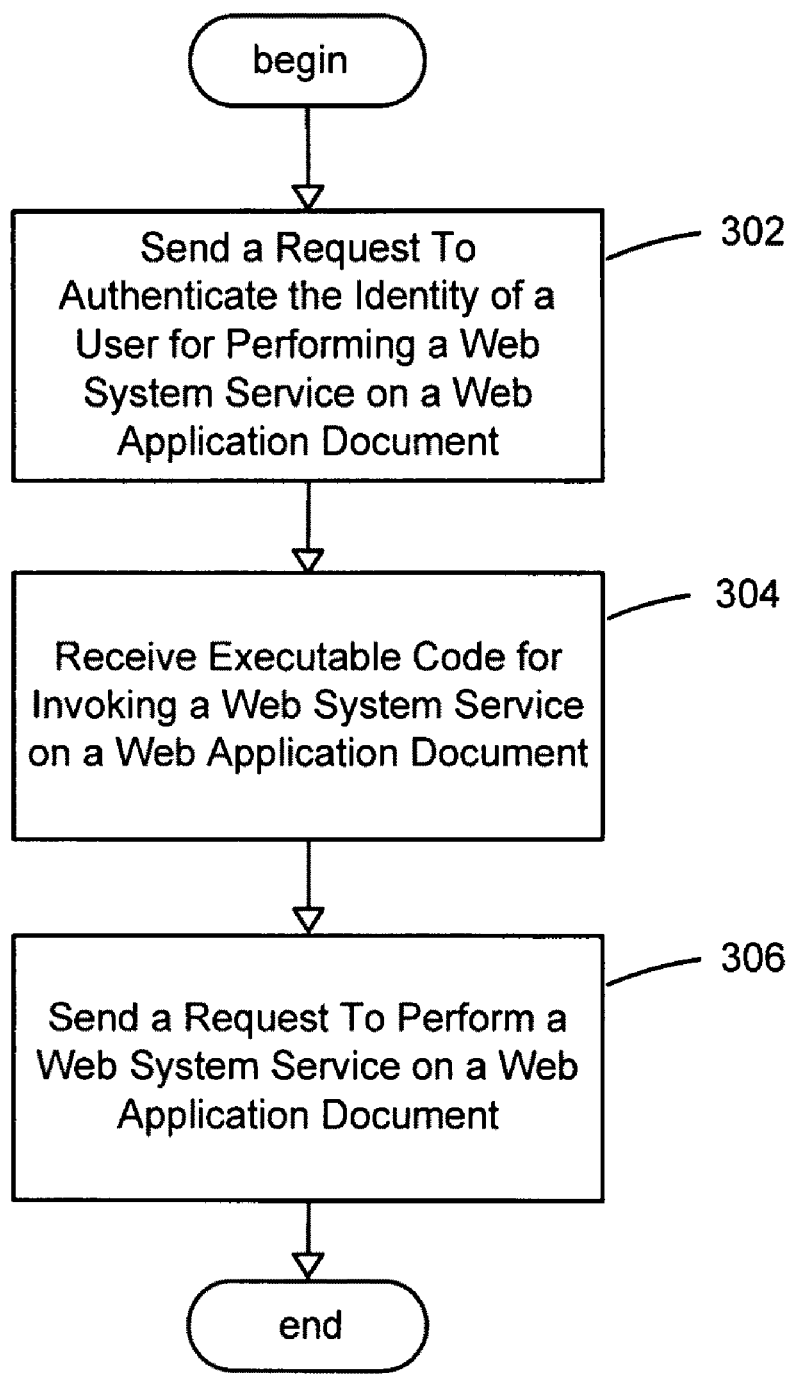
FIG. 3 is a flowchart for generally representing the steps undertaken in one embodiment for requesting a web system service to be performed on a web application document, in accordance with an aspect of the present invention.

FIG. 3 presents a flowchart for generally representing the steps undertaken in one embodiment for requesting a web system service to be performed on a web application document. For example, an application on a client device may request web system services to be performed to create and to store a web application document on a web application server. A request may be sent at step 302 to authenticate the identity of a user for performing a web system service on a web application document. In order to support storage on the web, user identities may be mapped to stored information, and may be authenticated in varying degrees to conform to the sensitivity of the information provided. A user, operating a web brower on a network-connected client device such as a computer or mobile phone, may be a registered user of the system and may be authenticated by sending a user identification and password to a web application server. The web application server may communicate the user identification and password to the identity authentication server for validation. User identities associated with the web application server may be authenticated with varying degrees of surety as required by the service provider or user. A user identification and password might be sufficient in some instances while stronger authentication may be employed in other embodiments as required by a service operator. For example, multi-factor authentication may be required for access to stored documents and application services such as a user identification, password, and a hardware token that periodically generates ephemeral PINs. Such multi-factor authentication requirements would most typically be associated with services made available by an enteprise, governmental, or other organization. As a practical matter, it is important to keep in mind that user authentication is also relevant with respect to business models. Under a pay-as-you-go business model for software use, or for single pay-per-use business models, authentication may require a check to see if a user has paid the subscription fee for access to the web system services.

Returning to FIG. 3, executable code may be received at step 304 for invoking a web system service on a web application document. In an embodiment, an implementation of a user interface menu, web system services interface code and associated programmatic functionality may be dynamically loaded when a client may request authentication of a user. In various embodiments, part or all of the executable code may be loaded from client storage, or part or all of the executable code may be loaded in various other embodiments from a web application server via the network. An implementation of web system service interface code may include a NewWebAppDoc application programming interface (API) that may be invoked by an application executing on a client to request a web application document to be created, a SaveWebAppDoc API that may be invoked by an application executing on a client to request a web application document to be saved, and a RestoreWebAppDoc API that may be invoked by an application executing on a client to request the content of a web application document to be loaded from the web into the application using the context stored in the web application document.

A request may then be sent at step 306 to perform a web system service on a web application document. For example, a user may create a new web application document in the client browser by selecting New in the web application menu to invoke an API such as NewWebAppDoc. The user may then add content to the document, such as an image or text, and then save the web application document by selecting Save in the web application menu to invoke an API such as SaveWebAppDoc to save the web application document on the web. In an implementation, the web application document may be transmitted though a network to a web application server, which may write the web application document into a named "Folder" or section of a hard drive. Such a folder may be named by a user, as a user may name a folder on a local hard drive of a client. If a user may wish to review a web application document or to create a new one, a conventional web server may be accessed in an embodiment by a client. The web server may either pass control to a web application server or obtain relevant information from the web application server and transmit the information to the client through the network for accessing or creating a web application document.

Figure 4:
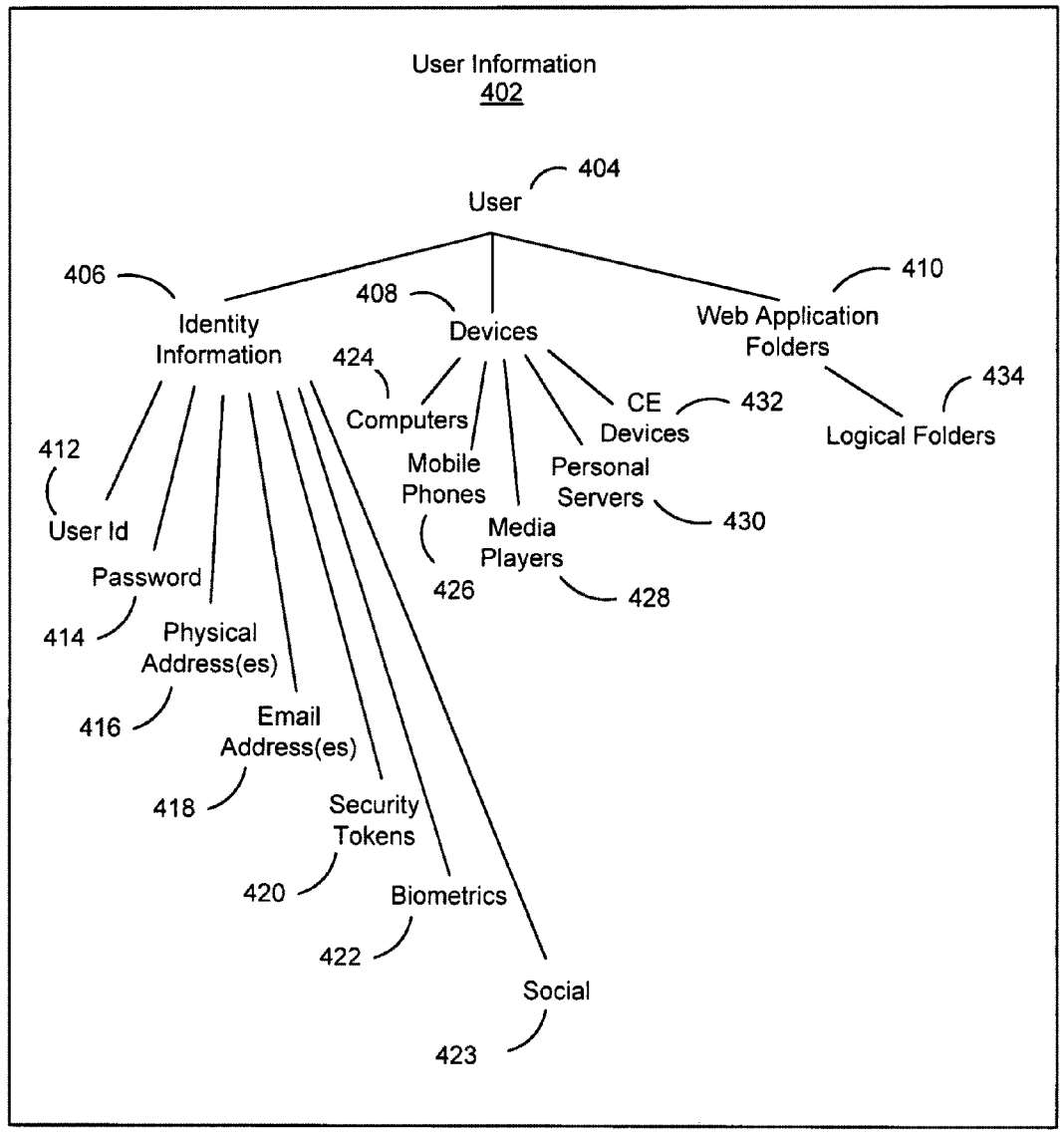
FIG. 4 is an illustration depicting in an embodiment a logical relationship of user properties for storing web application documents on the web, in accordance with an aspect of the present invention.

FIG. 4 presents an illustration depicting in an embodiment a logical relationship of user properties for storing web application documents on the web. In particular, FIG. 4 illustrates the logical relationship between a user 404 and a user's identity information 406, devices 408, and web application storage folders 410. Users may register accounts and create or receive credentials to be used during authentication. As part of the registration process, identity information 406 of a user 404 may be created including a user identification 412 or login, a password 414, a physical address 416, an email address 418, an assigned security token 420, biometrics 422, social network information 423 and so forth. Such identity information 406 may become a part of a user's information and may be stored as a set of fields in a database record corresponding with a particular user.

Additionally, a user may access the world-wide web using a range of different devices 408, such as one or more computers 424, a mobile phone 426, a media player 428, personal server 430, CE devices 432, or other devices. The network speed, display characteristics, internal memory and other characteristics may be substantially different for each of these devices. Content may be formatted differently for each of these different devices. For example, an image may be formatted for display on a cell phone screen with a different width and height than the same image formatted for display on a computer screen. Or a different pixel resolution may be used for devices connected to the web using slower network speeds to reduce bandwidth requirements.

Also web application folders 410 may be associated with a user's information. By invoking a web system service function, a user is able to create "logical" folders 434. Such a logical folder 434 may represent a directory in file storage and may be named by a user, stored in a database as part of the user's information, and associated with re-writable media such as that used in a conventional hard drive. A user may then store copies of a web application document in a web system services folder. Such stored information may be, in one implementation, written to a set of sectors on a magnetic disk, such that each sector contains a pointer to the next sector in the chain. The location of the header or start point of this chain of sectors containing user information may be stored in a table of such entries further associated with a user web application folder. Importantly, users may take full advantage of a scalable set of storage devices without requiring exposure to the details of where these devices are physically located.

Figure 5:
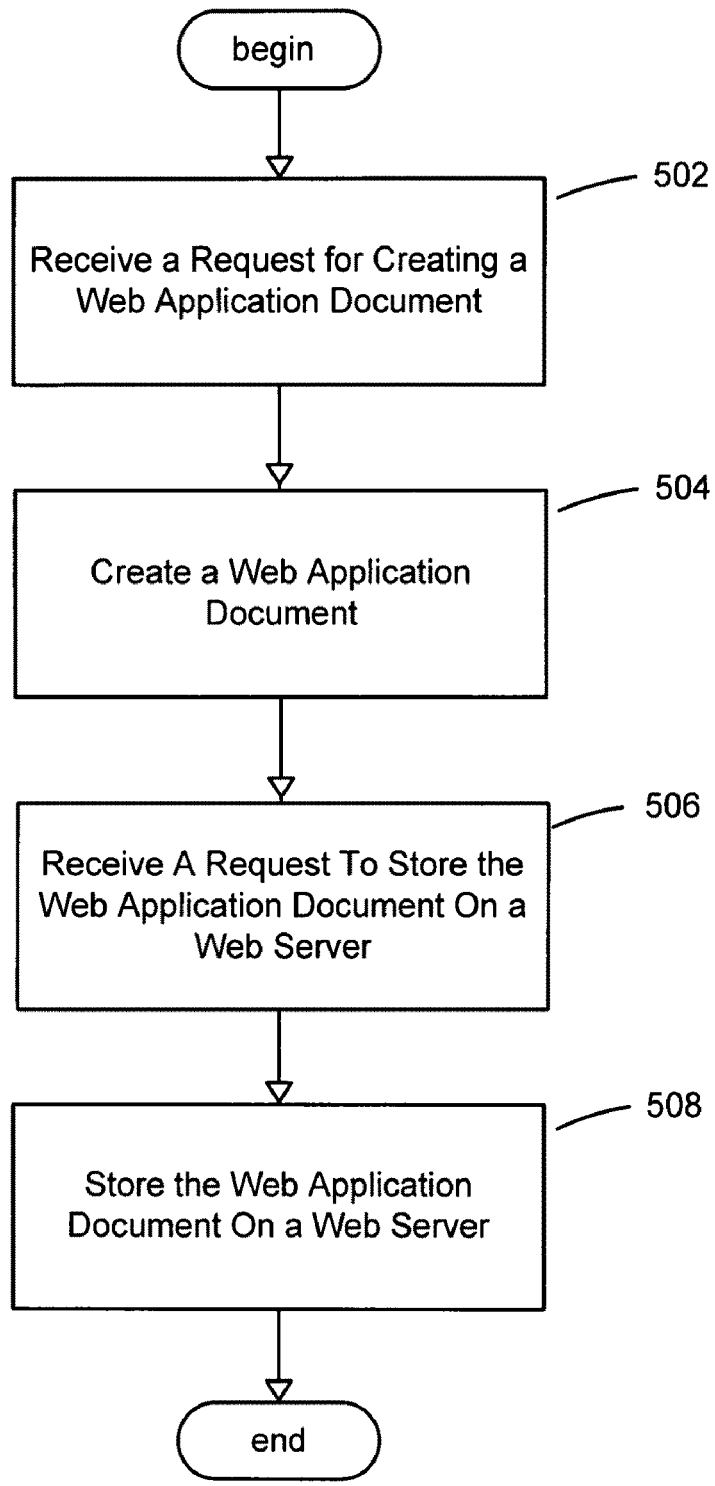
FIG. 5 is a flowchart for generally representing the steps undertaken in one embodiment for creating a web application document, in accordance with an aspect of the present invention.

FIG. 5 presents a flowchart for generally representing the steps undertaken in one embodiment for creating a web application document. A request may be received at step 502 for creating a web application document. In an embodiment, a user may select a web system service UI control for creating a web application document and a web system service interface may receive a request for creating a web application document from the web system service UI control. For example, a user may create a new web application document in the client browser by selecting New in the web application menu to invoke an API such as NewWebAppDoc. The web system service may then be performed on the client and a web application document may be created at step 504. As part of creating the web application document, content from an application may be input into the web application document.

A request may then be received at step 506 to store the web application document on a web server, and the web application document may be stored on a web server at step 508. For instance, a user may select a web system service UI control in an embodiment for storing a web application document, and a web system service interface may receive a request for storing a web application document from the web system service UI control. In an embodiment, a user may request a web application document in a client browser to be stored on the web by selecting Save in the web application menu to invoke an API such as SaveWebAppDoc to save the web application document on the web. In an implementation, the web application document may be transmitted though a network to a web application server, which may write the web application document into a named "Folder" or section of a hard drive.

Figure 6:
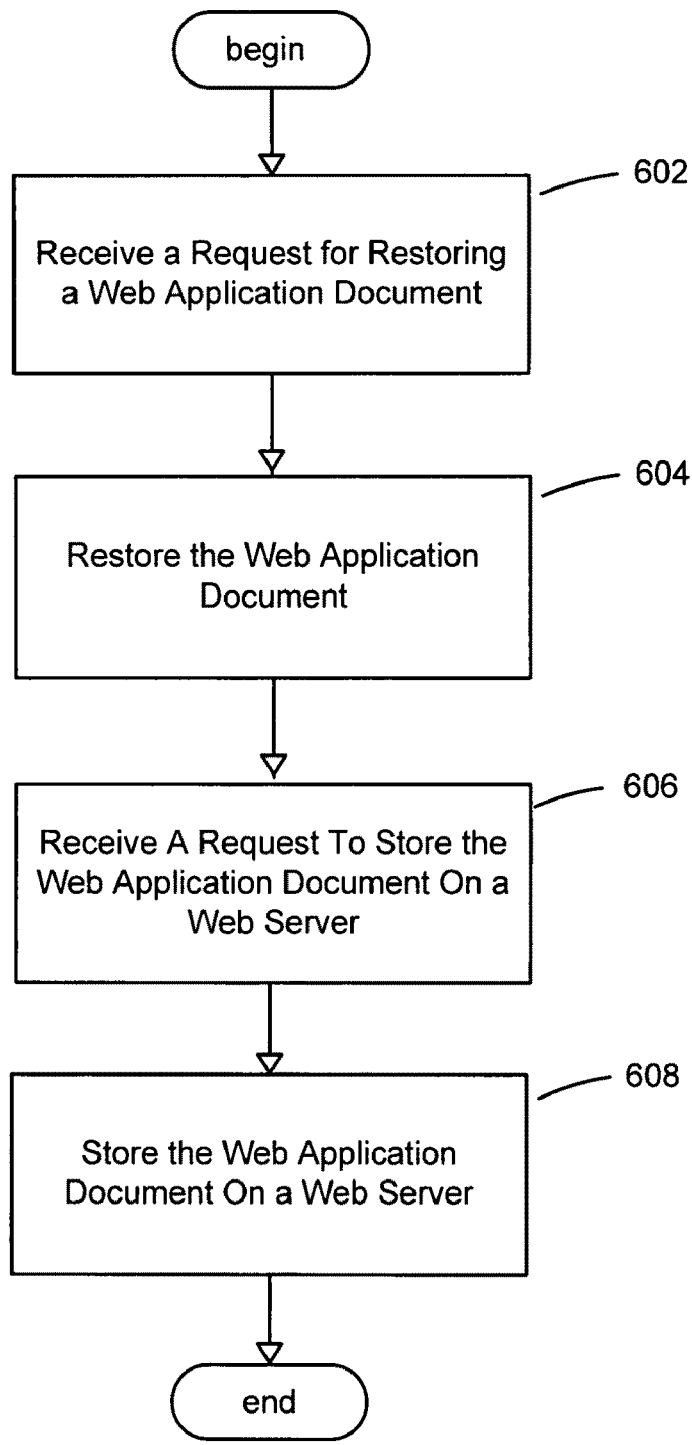
FIG. 6 is a flowchart for generally representing the steps undertaken in one embodiment for restoring a web application document, in accordance with an aspect of the present invention.

FIG. 6 presents a flowchart for generally representing the steps undertaken in one embodiment for restoring a web application document. A request may be received at step 602 for restoring a web application document stored on a web server. In an embodiment, a user may select a web system service UI control on a client for restoring a web application document from a web server on the client and a web system service interface on the client may receive a request from the web system service UI control for restoring a web application document. For example, a user may restore a web application document in an application operating on a client by selecting Restore in the web application menu to invoke an API such as RestoreWebAppDoc. The web system service may then be performed on the client by request the content of a web application document to be loaded from the web into the application using the context stored in the web application document. After the content of the web application document may be loaded in the application, the content may be modified by the application.

A request may then be received at step 606 to store the content of an application in a web application document on a web server, and the content may be stored in a web application document on a web server at step 608. For instance, a user may request that content in a client application be stored in a web application document on the web by selecting Save in the web application menu to invoke an API such as SaveWebAppDoc in an embodiment to save the content in a web application document on the web. The web system service may then save the content in a web application document and send a request to a web application server to store the web application document on a web server.

Figure 7:
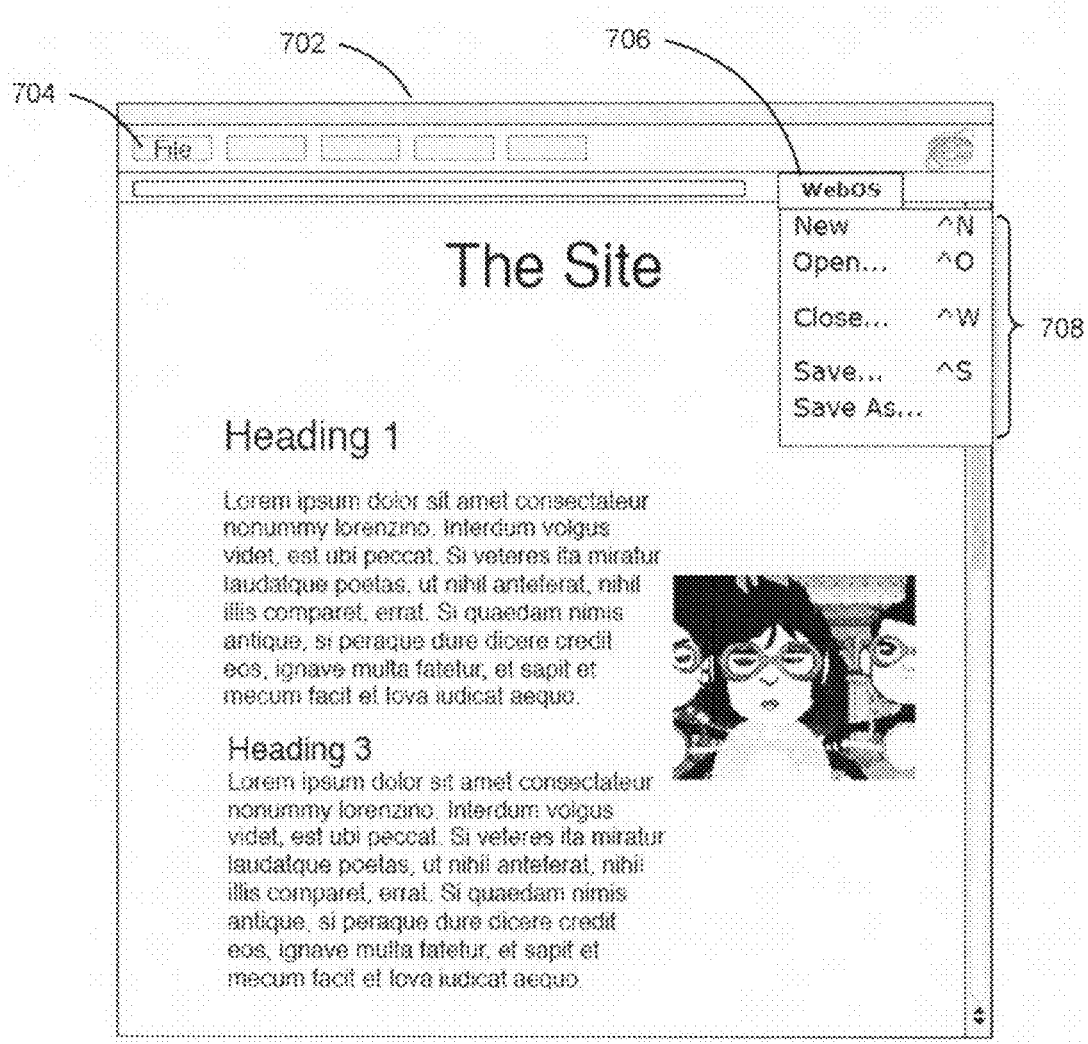
FIG. 7 is an exemplary illustration generally representing a graphical user interface for invoking web system services for supporting web applications to store data and context as a web application document on a web server, in accordance with an aspect of the present invention.

FIG. 7 presents an exemplary illustration generally representing a graphical user interface for invoking web system services for supporting web applications to store data and context as a web application document on a web server. FIG. 7 illustrates a screen of a web browser 702 that may include a File button 704 that may be selected to provide a drop down menu of file operations that may be performed upon a file stored on a client machine. FIG. 7 also illustrates a WebOS button 706 that may be selected to provide a drop down menu of web system service operations that may be performed on web application documents. Such web system service operations may include New, Open, Close, Save, Save As, Restore, and so forth. A user may have an application, such as a word processing application or a spreadsheet application, executing on a client performing operations on the content of a file, such as a word processing document or a spreadsheet, and the user may request that a web system service operation be performed on a web application document. For instance, the user may select Save in the WebOS drop-down menu to request that the content in the application file be stored in a web application document on the web. Or the user may open a web application document stored on the web by selecting Open in the WebOS drop-down menu for loading the content stored in the web application document into the application file operated upon by the application executing on the client.

When web system service operations may be selected using the graphical user interface, web system service APIs may be invoked for performing the requested web system service. In an embodiment, a NewWebAppDoc API may be invoked to request a web application document to be created, a SaveWebAppDoc API may be invoked to request content from an application to be saved in a web application document, and a RestoreWebAppDoc API may be invoked to request the content of a web application document to be loaded from the web into the application using the context stored in the web application document.

Figure 8:
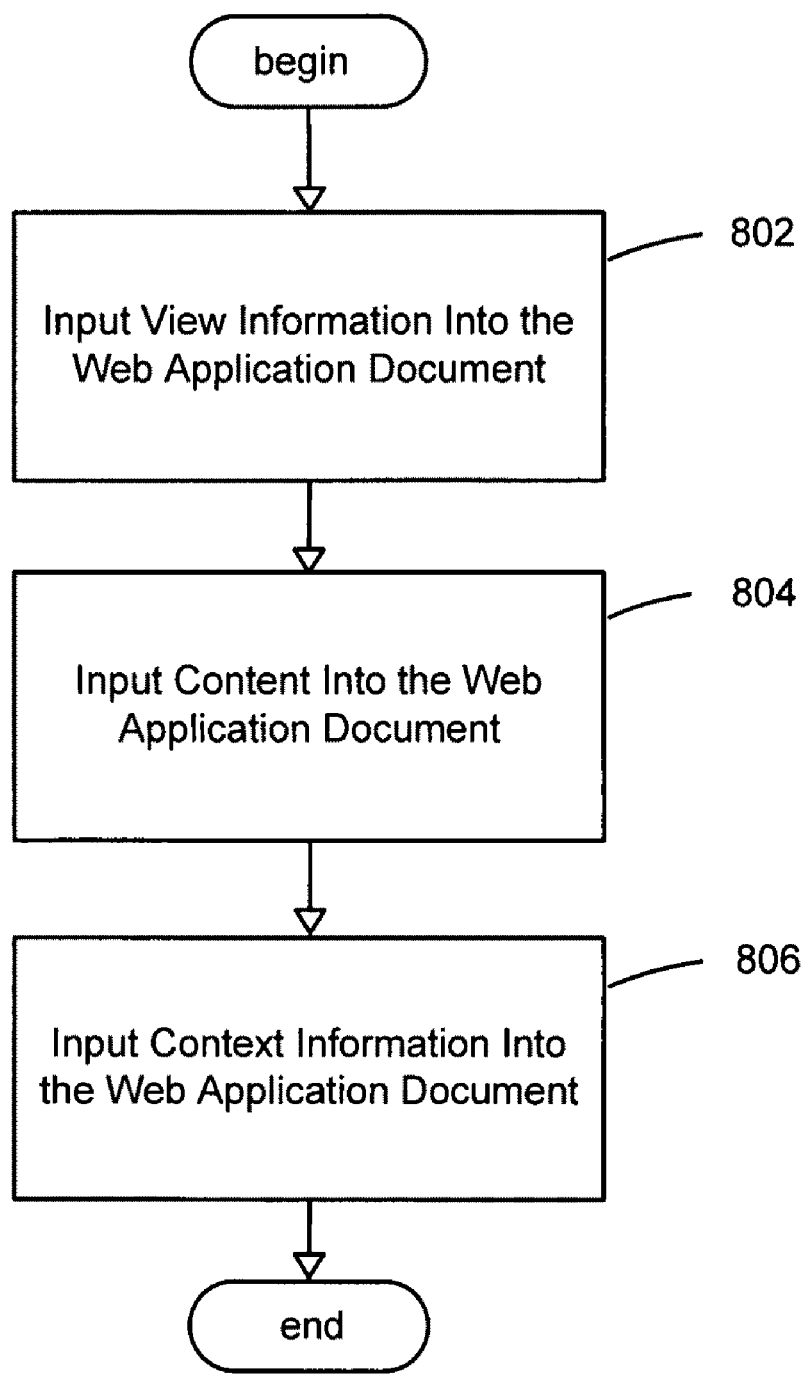
FIG. 8 is a flowchart for generally representing the steps undertaken in one embodiment for creating a web application document, in accordance with an aspect of the present invention.

FIG. 8 presents a flowchart for generally representing the steps undertaken in one embodiment for creating a web application document. In general, a web application document may include view information, content, and context information. At step 802, view information may be input into the web application document. View information may provide information about the organization structure determining presentation to user, such as HTML or Cascading Style Sheet (CSS) declarations, or determining the file format of a client application file, such as a word processing file or a spreadsheet file.

Any type of content may be input into the web application document at step 804. Different types of content stored in various client application files may be input into a web application document, including text, graphics, video, audio, and multimedia content. And context information may be input into the web application document at step 806. Context information is related to the content of a web application document and may be implicitly related, such as activities performed by a client device around the time the document was created or edited, or explicitly related, as in keywords associated with a given web application document by a user. In an embodiment, references to the context information may be stored in a web application document, instead of storing the context information itself.

Figure 9:
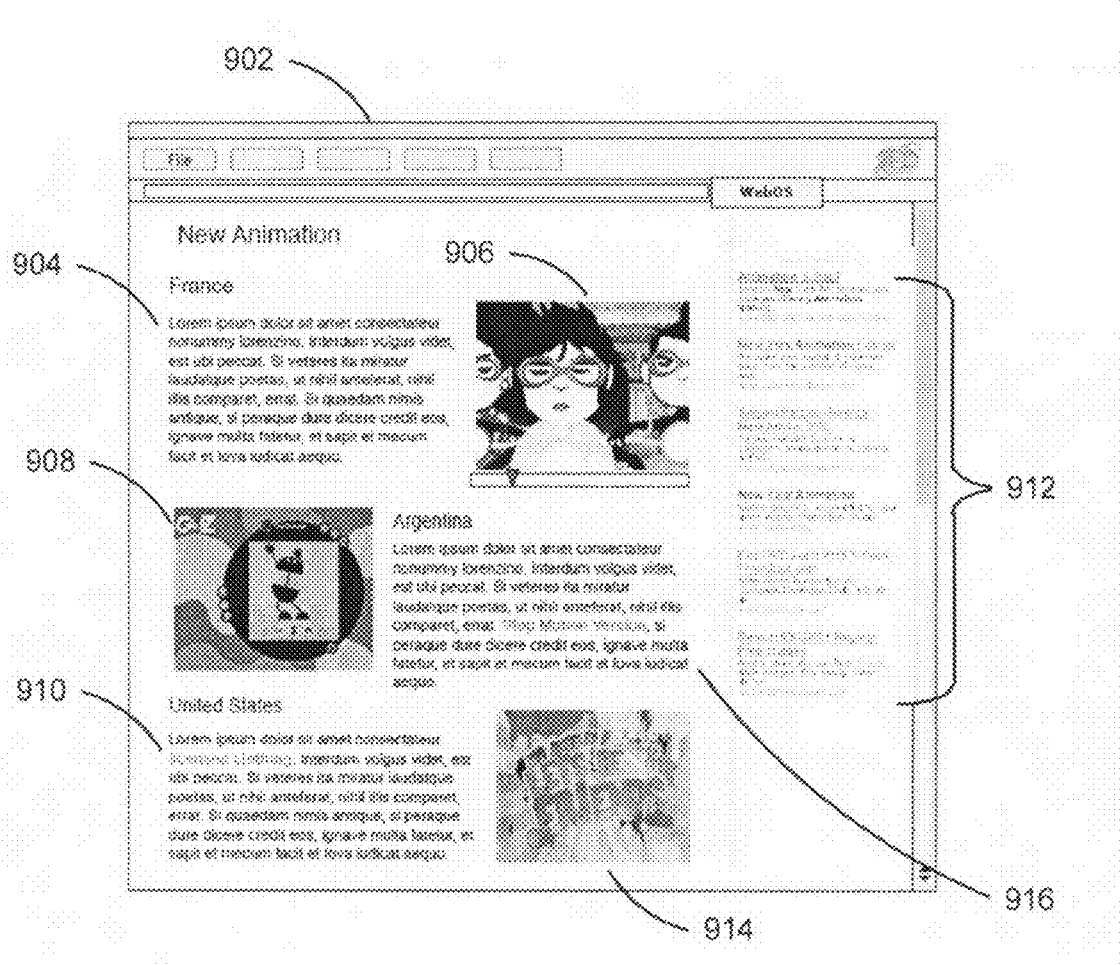
FIG. 9 is an exemplary illustration generally representing elements of a content file for a client application that may be input into a web application document, in accordance with an aspect of the present invention.

FIG. 9 presents an exemplary illustration generally representing elements of a content file for a client application that may be input into a web application document. In particular, FIG. 9 illustrates a screen of a web browser 902 that may include text 904, 916 and 910, images 906, 908 and 914, and links 912 to other web pages. The view information for a client application such as web browser 902 may be HTML or CSS declarations. Notice that the HTML file may include different types of content that may be stored in a web application document, including text, images, and links to other web pages. In various embodiments, links to web pages may be determined through analysis or context information associated with the web application document, and may include links to related information, related people, one or more search links returning results related to context or content information embodied in the web application document. In various other embodiments, applications for detecting and extracting context information, for example in a web page, may be used to collect context information that may be stored in a web application document.

Figure 10:
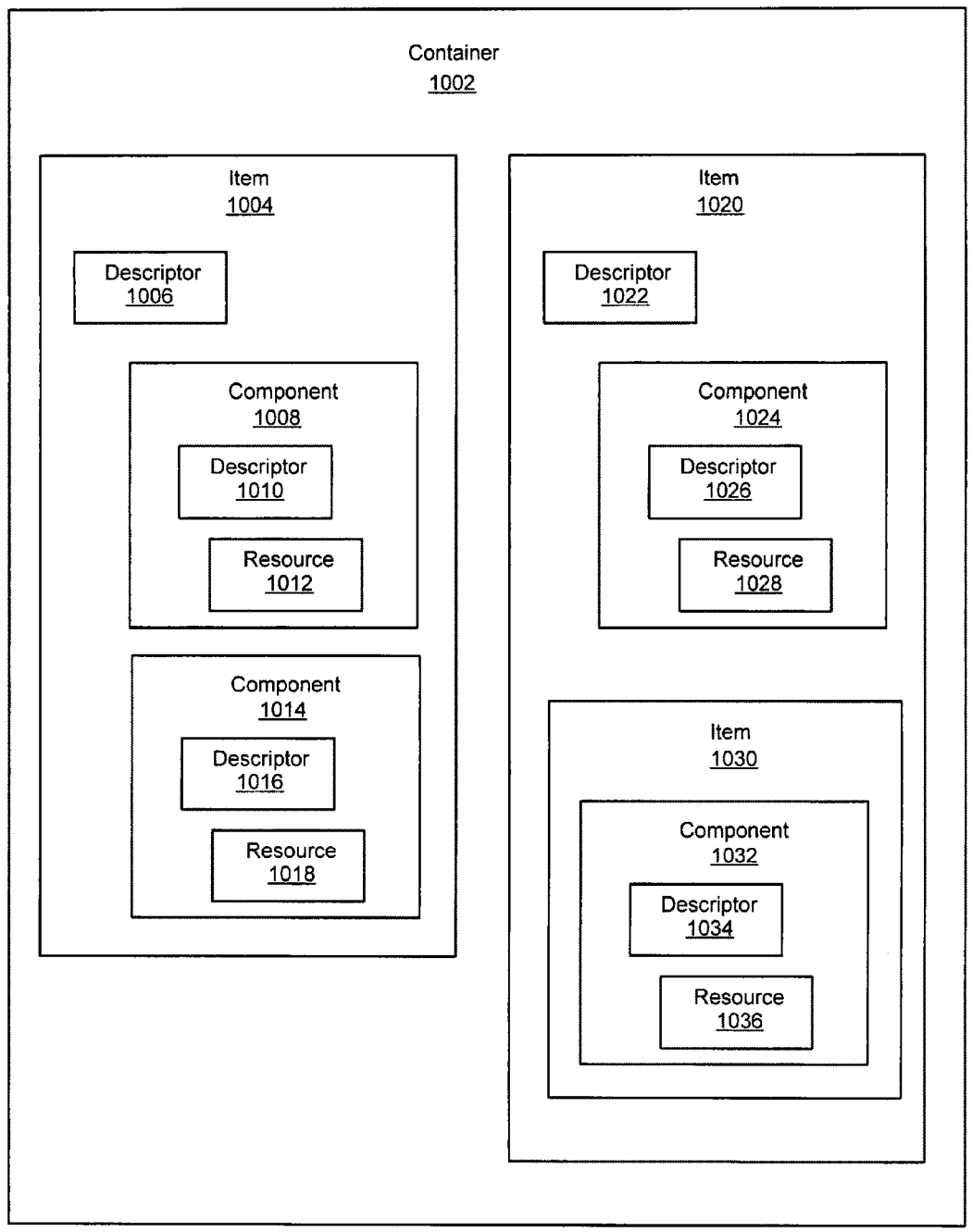
FIG. 10 is a block diagram generally representing an exemplary architecture of components in an embodiment for a web application document, in accordance with an aspect of the present invention.

FIG. 10 presents a block diagram generally representing an exemplary architecture of components in an embodiment for a web application document. In general, a web application document may be represented by a data structure such as container 1002 illustrated in FIG. 10. The container 1002 may include a set of nested items such as that described in the MPEG-21 standard in further details. Each item may include a descriptor and one or more components and/or one or more items. For instance, item 1030 is illustrated in FIG. 10 as nested within item 1020. A component may include a descriptor and resource. Each of the components 1008, 1014, 1024, and 1032 illustrated in FIG. 10 includes a descriptor and resource, such as descriptor 1010 and resource 1012 in component 1008, descriptor 1016 and resource 1018 in component 1014, descriptor 1026 and resource 1028 in component 1024, and descriptor 1034 and resource 1036 in component 1032. The descriptor information in the item may provide a declaration of the item and may further characterize the type of data. The resource information may store data of the type described in the descriptor information.

For example, the text 904 and the image 906 of FIG. 9 may be stored as item 1004 of FIG. 10. The descriptor 1006 may characterize the item as text with animation. The text 904 and the image 906 of FIG. 9 may be stored within item 1004 of FIG. 10 as components 1008 and 1014 respectively of item 1004. The descriptor information 1010 for the text component 1008 may declare the data type as string and the resource information 1012 may store the text as a text string. The descriptor information 1016 for the animation component 1014 may declare the data type as animation and the resource information 1018 may store the animation sequence. Similarly, other items, such at item 1020 and item 1030 might contain the URLs of images used in the document, or the folder and file names of the actual image files as stored in one of the user's web system services folders. Furthermore, a description of the content may also include the content history and metadata information that may also be stored along with the content. For instance, information about the original creator, where else the content may have been used, where the content originated, and so forth may be included in the descriptor of content items and components in a container. Such description of content may be available for modification and reuse as content may be modified and/or reused.

Additionally, context information may be stored in the container. For example, time or place context information may be stored as a set of strings within an item in the container. The descriptor information in the item may declare that the data is of type string and may further characterize the data as a timestamp representing the number of seconds from a given, standard starting point. Thus the view, content and context information may be generally included in a multi-form data container with a description of the information included in the container so that the encapsulated information may be archived, transmitted, accessed by processes, etc. Such a web application document, with its enriched context information, may make available a rich set of information that may be enhanced by external processes. For instance, a web application document may include context information about related subjects, for example, which can be inspected by a browser that retrieves relevant information dynamically generated by others on other websites over time. A web application document may also include temporally organized communications information, such as a list of communiques received by the creator during the creation of the document and related to that document by content or other context.

Thus, a browser might be able to call forth a list of emails relevant to the document, providing retrospective context to the document creator at a later review date.

Those skilled in the art will appreciate that such clustering of the information in a data structure representing the web application document may be accomplished in various embodiments using a variety of data structures. For instance, the clustering of the information may be accomplished as illustrated in FIG. 10 by container model, or using other methods, such as by creating linked entries in an XML object database, where the data in each object corresponds to and is arranged according to the XML tags that characterize the data.

Figure 11:
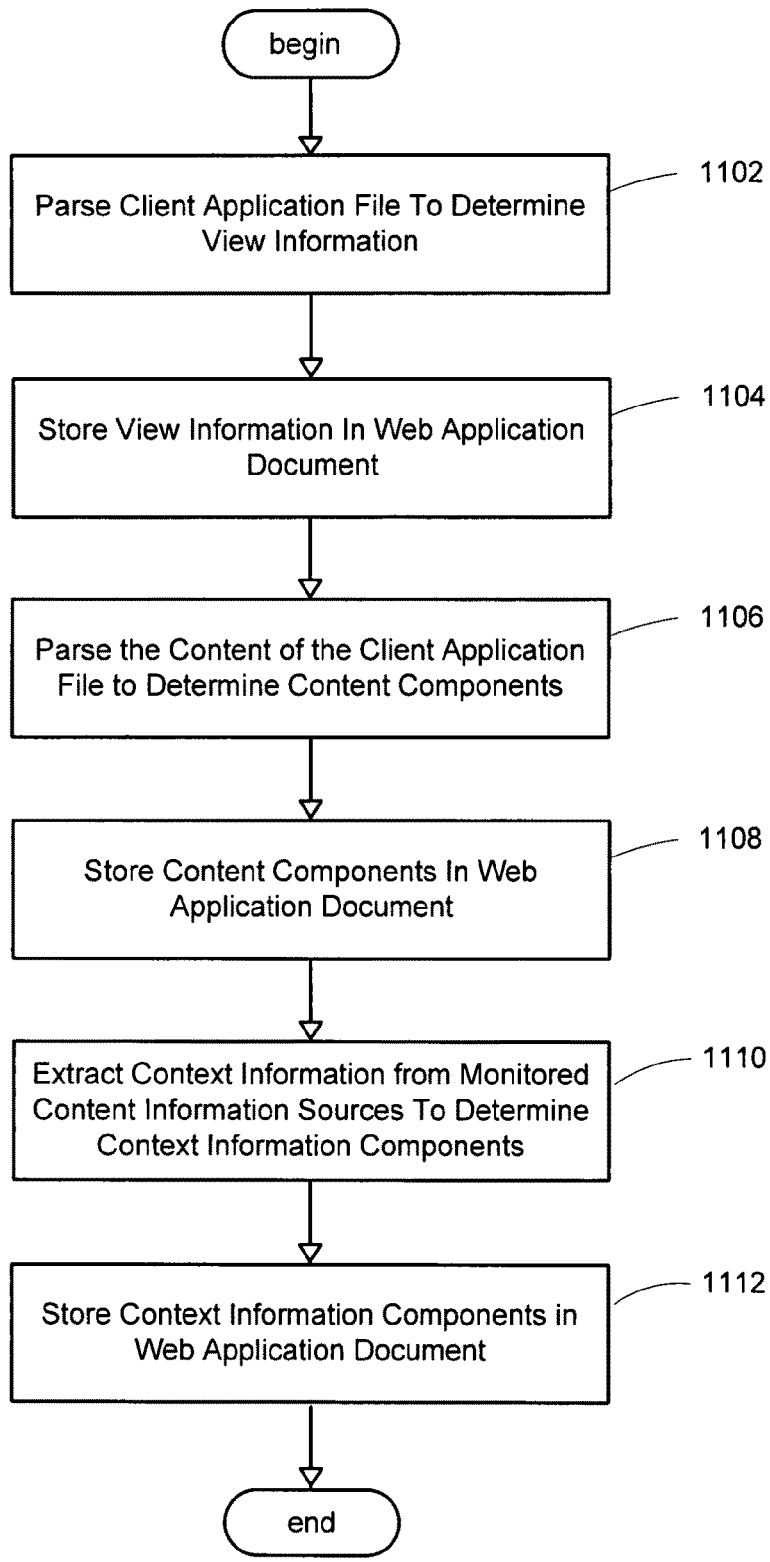
FIG. 11 is a flowchart for generally representing the steps undertaken in one embodiment to transfer content and context information of a client application file into a web application document, in accordance with an aspect of the present invention.

FIG. 11 presents a flowchart for generally representing the steps undertaken in one embodiment to transfer content and context information of a client application file into a web application document. At step 1102, a client application file may be parsed to determine view information that may be input into the web application document. For example, the web page file displayed on the screen of the web browser 902 illustrating in FIG. 9 may be parsed and it may be determined that the view information for presentation may be HTML. The view information may then be stored at step 1104 into the web application document. In an embodiment, the view information may be stored as a set of strings within an item in a container, such as the container 1002 illustrated in FIG. 10.

At step 1106, the content of a client application file may be parsed to determine the content components that may be input into the web application document. A parser, like content parser 212 of FIG. 2, may parse content of the client application file outputting content components identified in the client application file. The context components may then be stored at step 1108 into the web application document.

At step 1110, context information may be extracted from monitored content information sources to determine context information components that may be input into the web application document. A monitor, like context information monitor 210, may monitor and collect context information related to the content of a web application document to be incorporated into a web application document. At step 1112, context information components may be stored into the web application document. After the view information, content, and context information may be stored in a web application document, processing may be finished for transferring content and context information of a client application file into a web application document.

Figure 12:
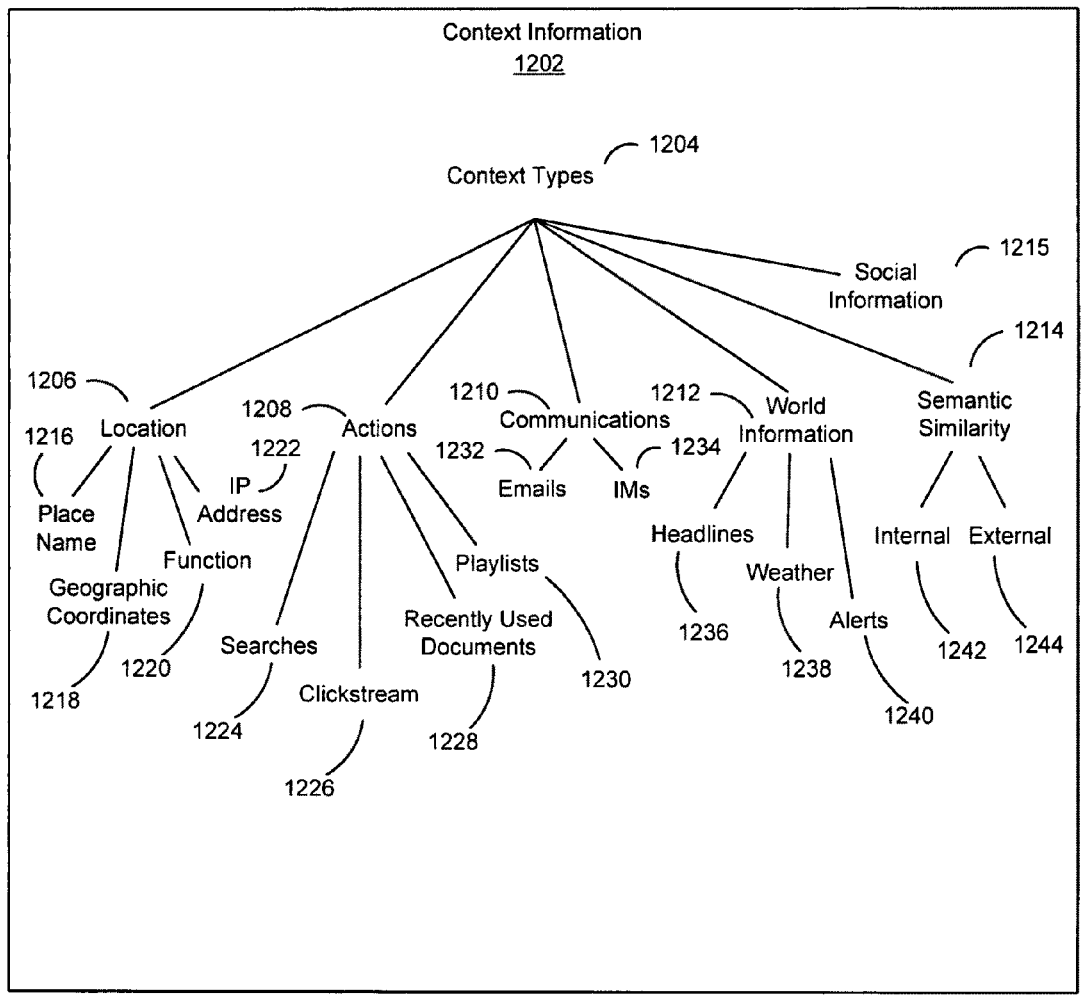
FIG. 12 is an illustration depicting in an embodiment a logical relationship of context information for storing web application documents on the web, in accordance with an aspect of the present invention.

FIG. 12 presents an illustration depicting in an embodiment a logical relationship of context information for storing web application documents on the web. Context information may generally mean information that is related to the content of a web application document. Such context information may be implicitly related, as in communications sent or received around the time the document was created or edited, or explicitly related, as in keywords associated with a given web application document by a user. In particular, FIG. 12 illustrates the logical relationship between context types 1204 of context information 1202 such as location 1206, actions 1208, communications 1210, world information 1212, semantic similarity 1214 and social information 1215. There may be many types of context information that may be implicitly or explicitly related to a web application document.

In an embodiment for instance, there may be a location context type 1206 for location information such as the name of the place 1216 where the client may be located, the geographic coordinates 1218 where the client may be located, the web application functions 1220 or services used for the web application document, the IP address 1222 of the device used to access the web application document, and so forth. There may also be an action context type 1208 for actions generally performed by a client device preceeding, during or following an operation performed on a web application document. These actions may include general activities performed by a client device or information about the activies such as searches 1224 on the web, clickstream activity 1226 captured by a web browser, recently used documents 1228, and playlists 1230. These action context types may be an example of context types of information explicitly related to a web application document. Communication context types may represent context information implicitly related to a web application document. A communication context type 1220 may represent context information of communications including email 1232, instant messaging 1234 and other types of text messaging or textual information sent or received. There may also be a world information context type 1212 for information about world events occurring and generally accessible by a client device preceeding, during or following an operation performed on a web application document. A world information context type may represent context information about world events including headlines 1236, weather 1238, alerts 1240, and other types of world events. This information may be captured from client services active on a client device such as RSS feeds providing headline news and other information.

There may also be a semantic similarity context type 1214 for capturing information that may be used to find other textual content with semantic similarity. This semantic similarity information may represent internal semantic similarilty information 1242 captured from the content of the web application document or may represent external semantic similarity information 1244 captured from world information or action information. For example, as content may be input into or content may be edited in a web application document, a semantic analyzer may monitor key terms and create inferred context information representing internal semantic context information. Thus, when a user writes frequently about animation, the term "animation" or "animate" may be captured as a key term stored as internal semantic similarity information. Likewise, a semantic analyzer may monitor and capture key terms in appearing in world information such as headline news. Semantic analysis may include word frequency matching for keywords and/or tags, and association of common individuals or groups of users may be identified by semantic analysis. Additionally, there may be social information context type 1215 for information about relationships to people, or relationships between people and the content of a web application document.

For any of these context types, those skilled in the art will appreciate that additional context information may be obtained. For example, additional social network information may be obtained including the extended set of individuals related to the content and/or to each other, or those related to a relevant concept or event. For example, if the content may be about animation, those who share an interest in animation in a user's social network may be associated as elements of social network type of context information. Or if the content may be about an animation festival, the group of users who had attended the animation festival, the festival event information and those who had RSVP'ed to attend the event might be included as elements of social network type of context information. Or additional location information may be obtained for instance that may include the time when the web application document was created, modified or accessed, the zip code, and other users present. Similarly, additional action information may include web pages accessed, documents saved or recalled, media stored and/or played, and/or other applications used. Additional communication information, world information and semantic similarity information may be obtained and used as context information.

Figure 13:
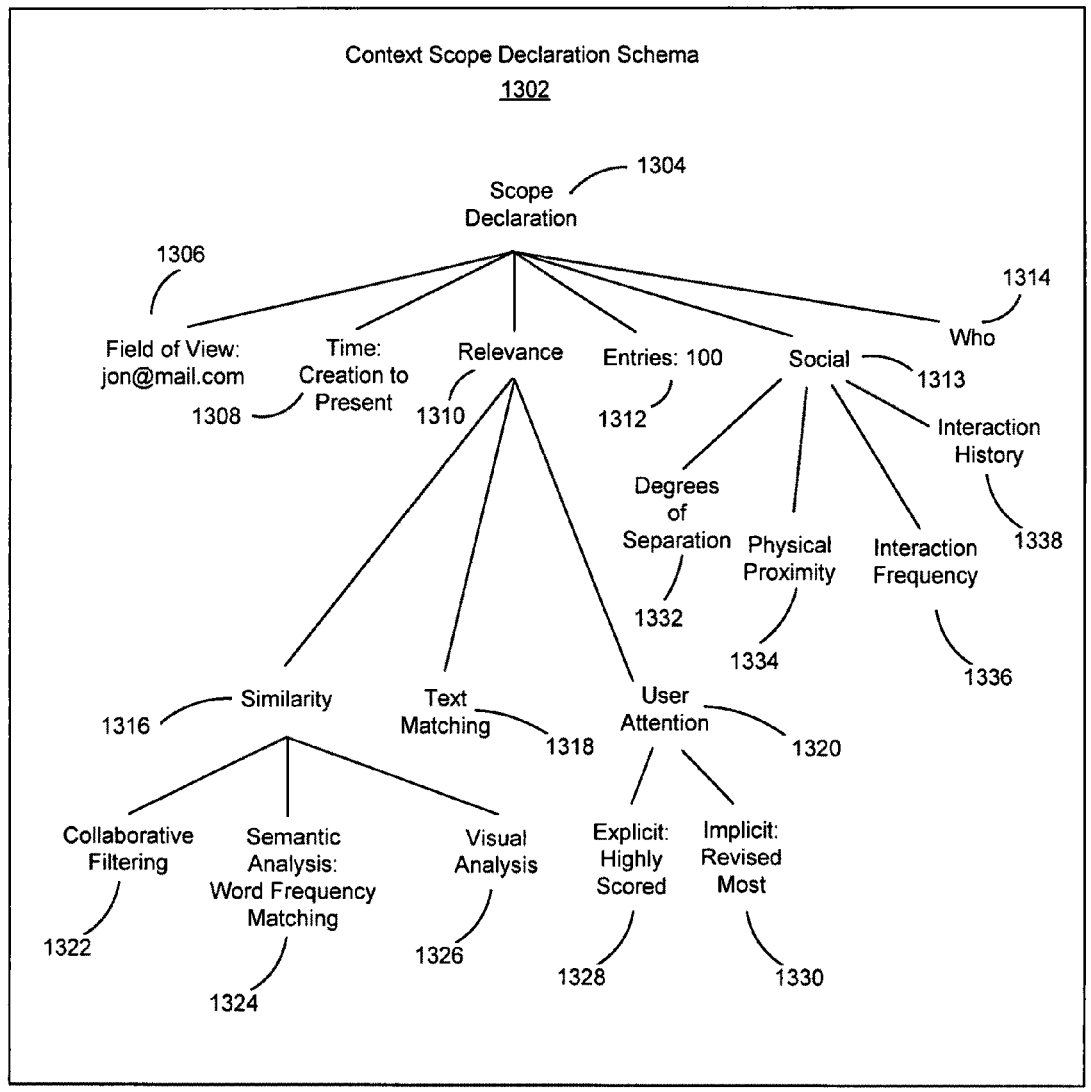
FIG. 13 is an illustration depicting in an embodiment a logical schema of elements for a context scope declaration applicable to a web application document, in accordance with an aspect of the present invention.

FIG. 13 presents an illustration depicting in an embodiment a logical schema of elements for a context scope declaration applicable to a web application document. In particular, FIG. 13 illustrates a context scope declaration schema 1302 as a logical schema of elements including a field of view 1306, a time 1308, relevance criteria 1310, entries to return 1312, social 1313, and who may be associated with the relevant information 1314. The field of view 1306 element may represent the breadth of subject information sources. For email, a field of view for a context type of communications may be an email address. The time 1308 element may represent a time span from a given point relating to the creation or use of a web application document. For instance, such a time span may be the period from one week prior to creation of the document until the present time. The relevance 1310 element may represent criteria for determining what items may be relevant. There may be various ways to declare relevance. The entries 1312 element may represent the number of matching items to return. The social 1313 element may represent relationships to people, or relationships between people and the content of a web application document. Thus, information about relationships may include degrees of separation 1332, physical proximity 1334, frequency of interactions 1336 and history of interactions 1338. In various embodiments such characteristics about relationships may be weighted, for instance, by degrees of separation, by physical proximity, by most recent or frequent interactions. The who 1314 element may represent the people associated with the relevant information such as names of people associated with the content, and perhaps profile information as may be found in an address book.

The criteria for determining what items may be relevant may include similarity 1316, text matching 1318, user attention 1320, and so forth. Similarity 1316 may be determined using collaborative filtering 1322, semantic analysis of word frequency matching 1324, and/or visual analysis 1326. User attention 1320 for a web application document may be determined either explicitly 1328 by being highly scored by a user or implicitly 1330 by being reviewed most.

Figure 14:
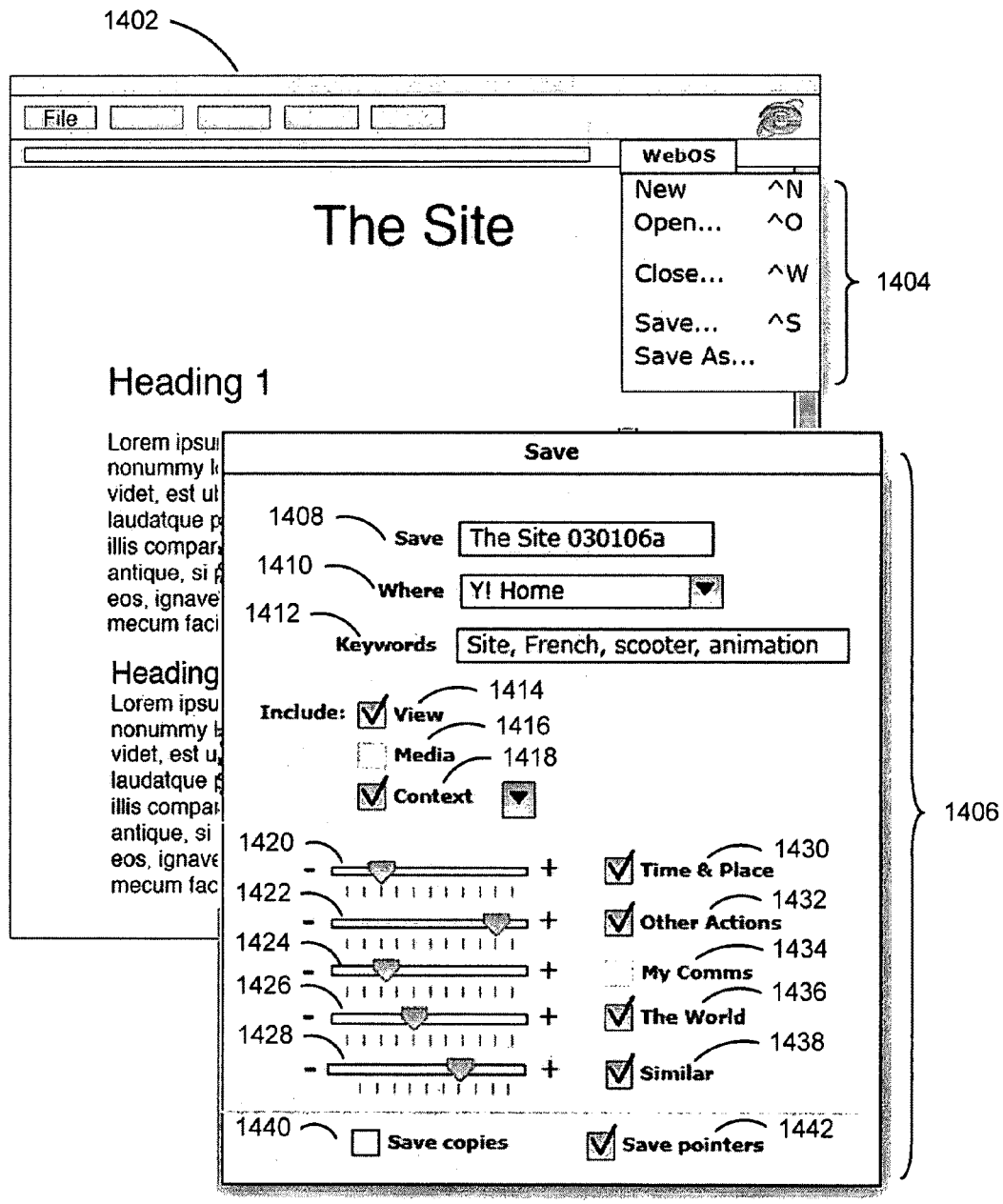
FIG. 14 is an exemplary illustration generally representing a graphical user interface for invoking a web system service for storing client application data and context as a web application document on a web server, in accordance with an aspect of the present invention.

FIG. 14 presents an exemplary illustration generally representing a graphical user interface for invoking a web system service for storing client application data and context as a web application document on a web server. FIG. 14 illustrates a screen of a web browser 1402 displaying a drop-down menu 1404 of web system service operations that may be performed on web application documents. Such web system service operations may include New, Open, Close, Save, Save As, Restore, and so forth. A user may have an application, such as a web browser, executing on a client that may display the contents of a web page retrieved from a web server. By selecting Save in the WebOS drop-down menu, the user may request that the content in the web page be stored in a web application document on the web. FIG. 14 illustrates a Save screen 1406 activated by a user selecting Save in the WebOS drop-down menu. The Save screen 1406 may include selectable options for a user to specify parameters for saving content of an application file and context information as a web application document on a web server. For example, the Save screen 1406 may provide a text input controls such as Save text input control 1408 for receiving a text describing what application file to save, the Where text input control 1410 for receiving a text description of the location to store the web application document, and/or a Keywords text input control 1412 for receiving keywords to be associated with the web application document.

The Save screen 1406 may also include selectable options for a user to specify parameters of the information to be saved in a web application document. For instance, the Save screen 1406 may provide check box controls such as check box control 1414 for selecting to save the view information of a client application file, a check box control 1416 for selecting to save the media or content of a client application file, and/or check box control 1414 for selecting to save the context information of a client application file. A user may choose to select a variable amount of context information by setting a slider control to indicate the amount of context information to save for different context types. There may be a slider control 1420 for selecting the amount of time and place context information 1430. There may be a slider control 1422 for selecting the amount of actions context information 1432. There may be a slider control 1424 for selecting the amount of communications context information 1434. There may be a slider control 1426 for selecting the amount of world information context information 1436. And there may also be a slider control 1428 for selecting the amount of similarity context information 1438.

Furthermore, a user may select to save either copies or references of the content or context information. In an embodiment, the Save screen 1406 may provide check box controls such as check box control 1440 for selecting to save copies of the content and context information and check box control 1442 for selecting to save pointers referencing the content and context information. Saving pointers referencing the content and context information may save storage space on the web server where the web application document may be stored, but may prove less reliable in restoring the web document, as reference information may have changed or become unavailable. Thus, a user might elect to store the document content itself where reliable restoring of exactly the information originally included is required, or elect to store references where this is not a requirement, or elect to store a combination in an interface configuration (not shown) where the variable nature of referenced information is desirable, such as to include a "picture of the day" relevant to the document content.

Figure 15:
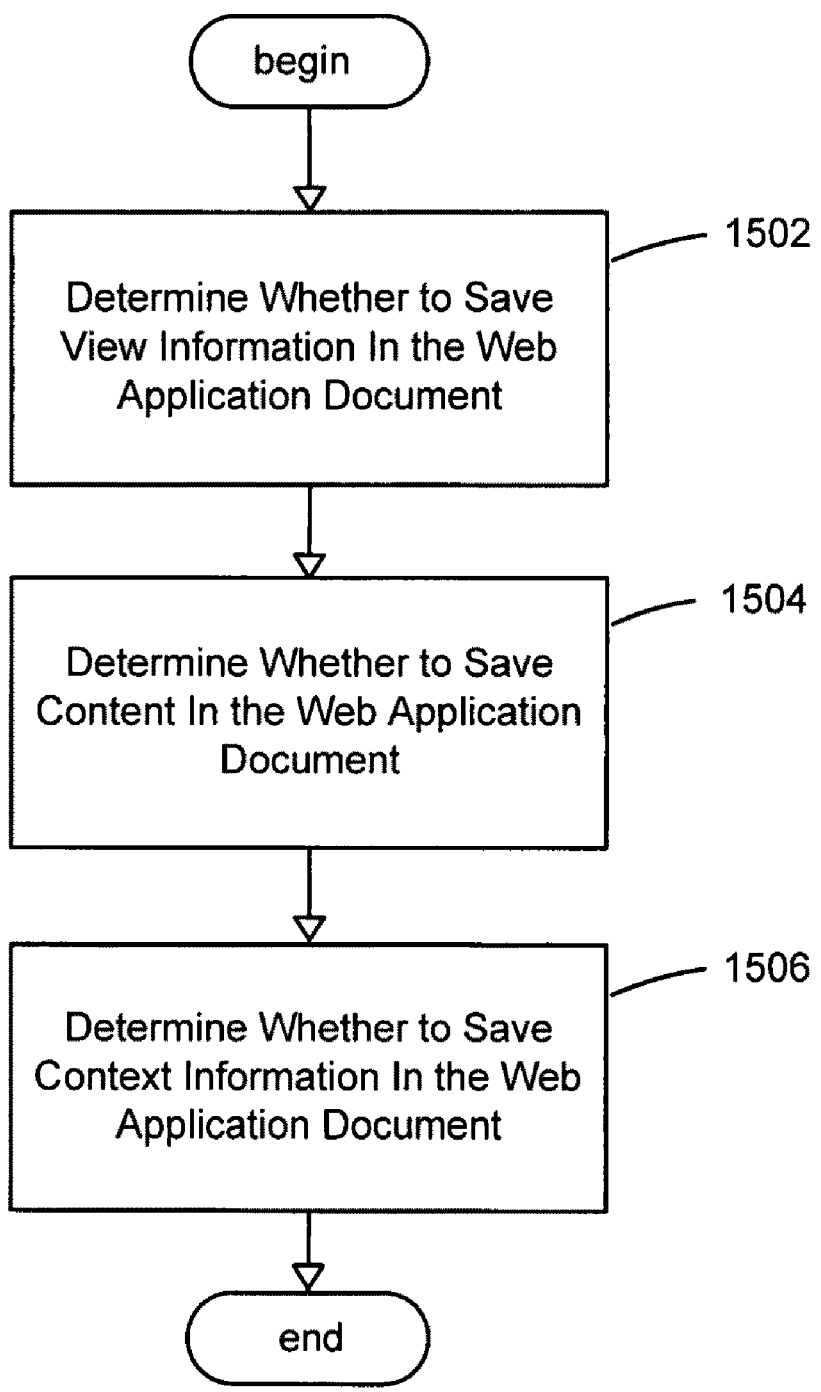
FIG. 15 is a flowchart for generally representing the steps undertaken in one embodiment for determining information to transfer from a client application file into a web application document, in accordance with an aspect of the present invention.

FIG. 15 presents a flowchart for generally representing the steps undertaken in one embodiment for determining information to transfer from a client application file into a web application document. At step 1502, it may be determined whether the view information may be stored into the web application document. For example, executable code invoked by the SaveWebAppDoc API may determine in an embodiment whether the view information may be stored in a web application document by performing a lookup of a setting indicating whether to store the view information in the web application document. Such a setting may be activated by input received in check box control 1414 of FIG. 14 for selecting to save the view information of a client application file.

At step 1504, it may be determined whether the content of a client application file may be stored into the web application document. Executable code invoked by the SaveWebAppDoc API may determine in an embodiment whether the content of a client application file may be stored in a web application document by performing a lookup of a setting, such as a setting activated by input received in check box control 1416 of FIG. 14, indicating whether to store the content in the web application document.

At step 1506, it may be determined whether the context information related to a client application file may be stored into the web application document. Executable code invoked by the SaveWebAppDoc API may determine in an embodiment whether the context information related to a client application file may be stored in a web application document by performing a lookup of a setting, such as a setting activated by input received in check box control 1418 of FIG. 14, indicating whether to store the context information in the web application document.

Figure 16:
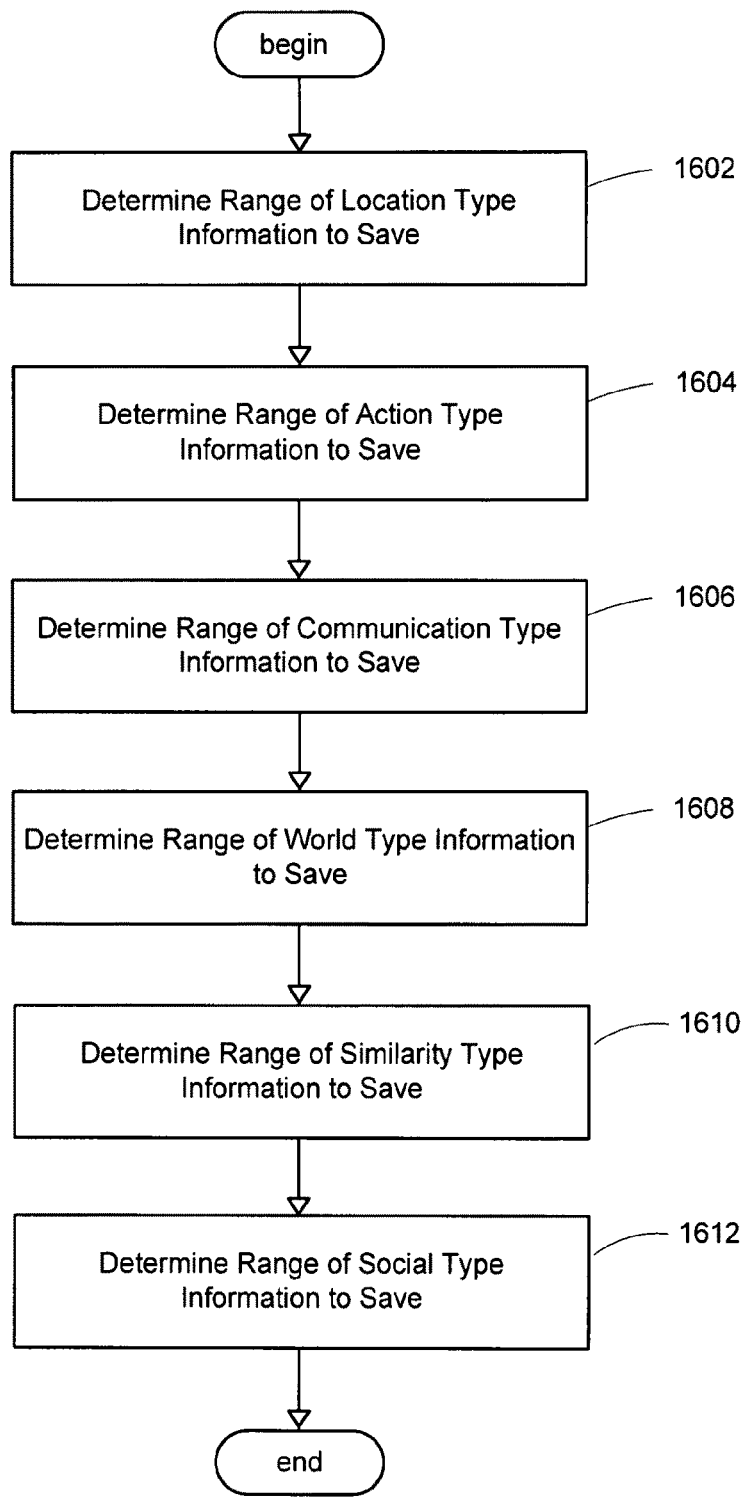
FIG. 16 is a flowchart for generally representing the steps undertaken in an embodiment for determining the amount of context information to transfer from a client application file into a web application document.

FIG. 16 presents a flowchart for generally representing the steps undertaken in an embodiment for determining the amount of context information to transfer from a client application file into a web application document. At step 1602, the amount of location type information may be determined to be stored into a web application document. In an embodiment, executable code invoked by the SaveWebAppDoc API may determine the amount of location type information to be stored in a web application document by performing a lookup of a setting indicating an amount of location type information to store in the web application document. For instance, a slider control, such as slider control 1420 of FIG. 14, may be moved by user input to a fixed setting for selecting the amount of location type information to save in a web application document.

At step 1604, the amount of action type information may be determined to be stored into a web application document. In an embodiment, executable code invoked by the SaveWebAppDoc API may determine the amount of location type information to be stored in a web application document by performing a lookup of a setting, such as a setting fixed by slider control 1422 of FIG. 14, indicating an amount of action type information to store in the web application document. Similarly, the amount of communications type information, the amount of world type information, the amount of similarity type information, and the amount of social type information may be determined to be stored into a web application document at steps 1606, 1608, 1610 and 1612 respectively. Executable code invoked by the SaveWebAppDoc API may determine the amount of communications type information, the amount of world type information, the amount of similarity type information, and the amount of social type information to be stored in a web application document by performing a lookup of settings, such as a settings respectivley fixed by slider controls 1424, 1426 and 1428 of FIG. 14.

Figure 17:
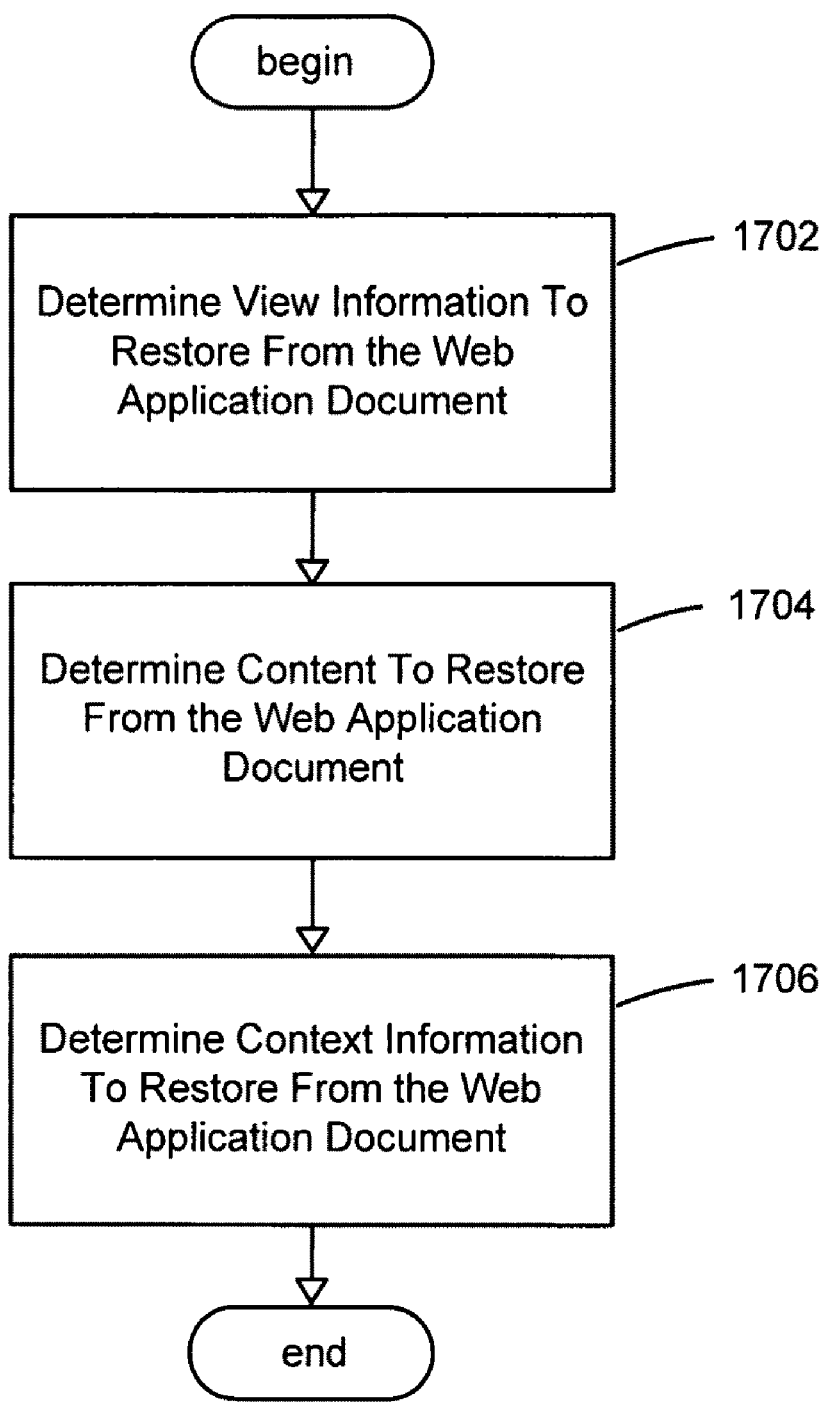
FIG. 17 is a flowchart for generally representing the steps undertaken in one embodiment for determining information to transfer from a web application document to a client application for display, in accordance with an aspect of the present invention.

FIG. 17 presents a flowchart for generally representing the steps undertaken in one embodiment for determining information to transfer from a web application document to a client application for display. At step 1702, the view information to be restored from the web application document to a client application may be determined. For example, executable code invoked by the RestoreWebAppDoc API may determine in an embodiment what view information may be stored in a web application document by loading the components of a web application file in the client and parsing the components. The view information found may be used to launch the application corresponding to the view information type. If the view information type may be HTML, than a web browser may be launched and the content components may be loaded from the web application file into a web browser for display.

At step 1704, the content to be restored from the web application document to a client application may be determined. For example, the content components found from parsing the components of the web application file by executable code invoked by the RestoreWebAppDoc API may be loaded from the web application file into a client application for display.

At step 1706, the context information to be restored from the web application document to a client application may be determined. For example, the context information components found from parsing the components of the web application file by executable code invoked by the RestoreWebAppDoc API may be loaded from the web application file into a client application or the web system services interface for access and display.

Figure 18:
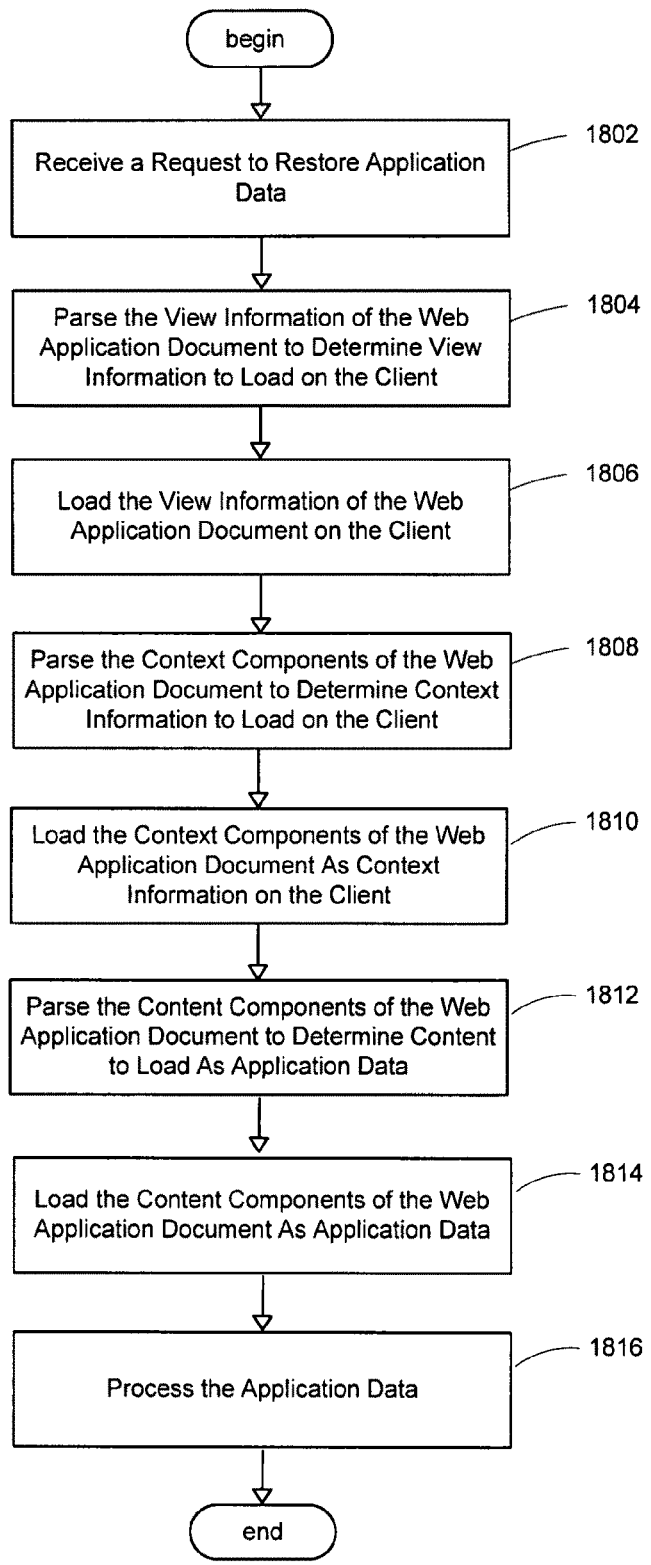
FIG. 18 is a flowchart for generally representing the steps undertaken in one embodiment to transfer content and context information from a web application document to a client application for display, in accordance with an aspect of the present invention.

Those skilled in the art may appreciate that selectable settings for view information, content information and context information may be set using default setting for individual devices or for a class of devices. FIG. 18 presents a flowchart for generally representing the steps undertaken in one embodiment to transfer content and context information from a web application document to a client application for display. At step 1802, a request may be received to restore application data for an application executing on a client device. In an embodiment, the RestoreWebAppDoc API may be invoked by receiving a request from a user interface to restore a web application document for a client application. In general, a parser, like content parser 212 of FIG. 2, may parse components of a container representing the web application document to identify information to load on the client device. The view information of a web application document may be parsed at step 1804 to determine view information that may be loaded on the client device. For example, a container representing a web application document may be parsed and it may be determined that the view information for presentation may be HTML. In an embodiment, the view information may be stored as a set of strings within an item in a container, such as the container 1002 illustrated in FIG. 10. The view information may then be loaded at step 1806 on the client device.

At step 1808, context information components of the web application document may be parsed to determine context information to load on the client device. The context information components may then be loaded at step 1810 as context information on the client device. At step 1812, the content components of the web application document may be parsed to determine content to load on the client device. The content components may then be loaded at step 1814 as application data on the client device. After the view information, content, and context information may be loaded on the client device, the application data may be processed by an application executing on the client device. A user may then request that the content and context information of a client application be stored as a web application document on a web server.

Figure 19:
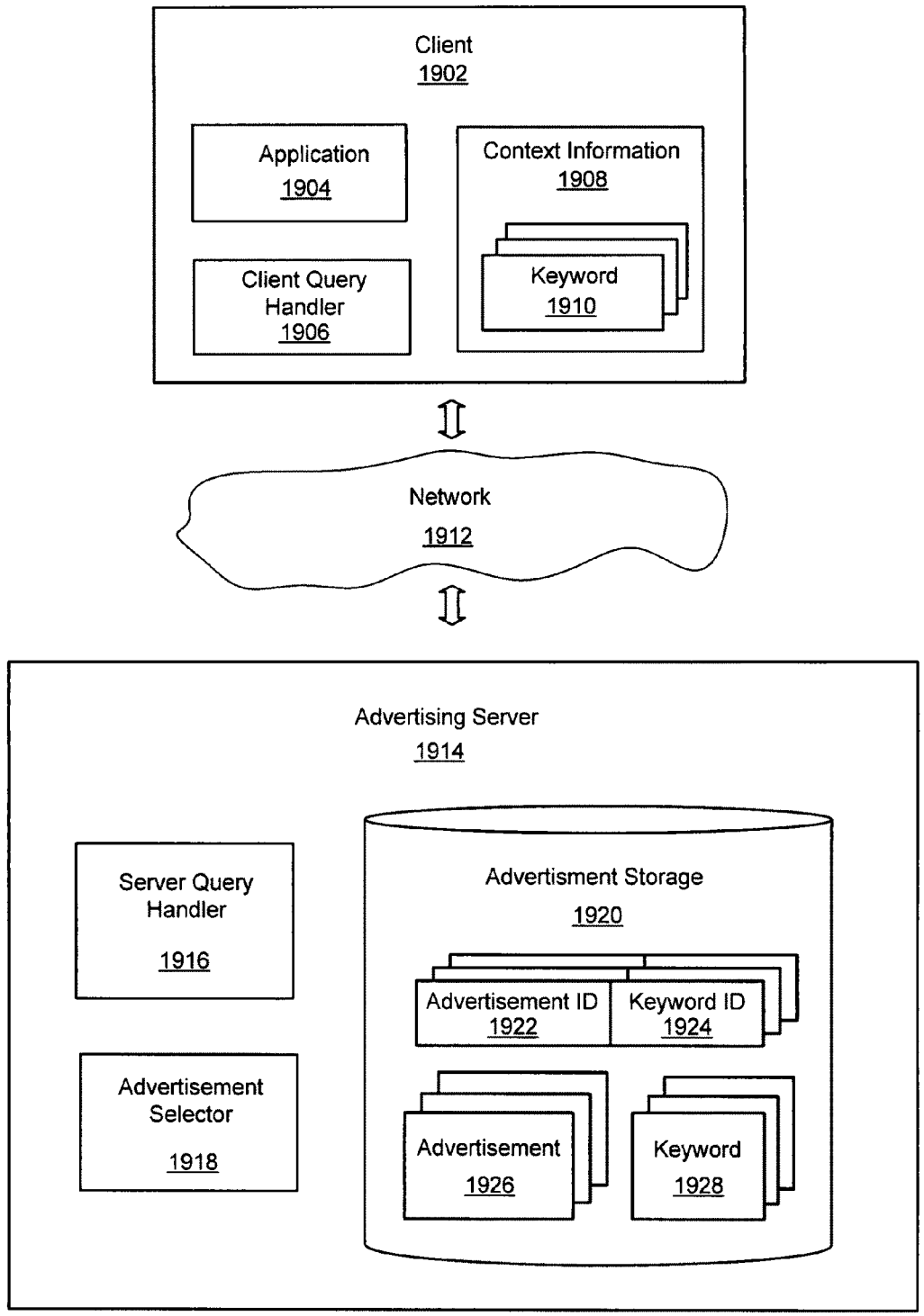
FIG. 19 is a block diagram generally representing an exemplary architecture of system components for using context information for online advertising applications, in accordance with an aspect of the present invention.

There may be any number of applications that may use the context and related information saved along with the content of a web application document. The context information may be used as a stream of keywords for online advertising applications. The keywords may be transmitted to an online advertising service that may return advertisements for display along with the application data or web application document. A user may click on these advertisements and generate revenue for the online advertising service. FIG. 19 presents a block diagram generally representing an exemplary architecture of system components for using context information for online advertising applications. Those skilled in the art will appreciate that the functionality implemented within the blocks illustrated in the diagram may be implemented as separate components or the functionality of several or all of the blocks may be implemented within a single component. For example, the functionality for the client query handler 1906 may be included in the same component as the application 1904. Moreover, those skilled in the art will appreciate that the functionality implemented within the blocks illustrated in the diagram may be executed on a single computer or distributed across a plurality of computers for execution.

In various embodiments, a client computer 1902 may be operably coupled to one or more advertising servers 1914 by a network 1912. The client computer 1902 may be a computer such as computer system 100 of FIG. 1. The network 1912 may be any type of network such as a local area network (LAN), a wide area network (WAN), or other type of network. An application 1904 may execute on the client computer 1902 and may include functionality for sending context information 1908 as a query to a client query handler 1906. The application 1904 may be operably coupled to the client query handler 1906 that may include functionality for receiving a query with context information 1908 that may include one or more keywords 1910 and may include functionality for sending a query request to an advertising server 1914 to obtain a list of advertisements for display. In general, the application 1904 and the client query handler 1906 may be any type of interpreted or executable software code such as a kernel component, an application program, a script, a linked library, an object with methods, and so forth.

The advertising server 1914 may be any type of computer system or computing device such as computer system 100 of FIG. 1. In general, the advertising server 1914 may provide services for query processing and may include services for providing a list of advertisements for display on a client. In particular, the advertising server 1914 may include a server query handler 1916 for receiving and responding to query requests, and an advertisement selector 1918 for choosing lists of advertisements for keywords of the queries. Each of these modules may also be any type of executable software code such as a kernel component, an application program, a linked library, an object with methods, or other type of executable software code.

The advertising server 1914 may be operably coupled to a database of advertisements such as advertisement storage 1920 that may include any type of advertisements 1926 that may be associated with an advertisement IDs 1922 and keywords 1928 that may be associated with keyword IDs 1924. In an embodiment, a keyword ID 1924 may be associated with an advertisement ID 1922 that may map keywords 1928 to advertisements 1926. A list of advertisements may be selected for one or more keywords and may be sent to the client computer 1902 for display along with application data of an application 1904.

Figure 20:
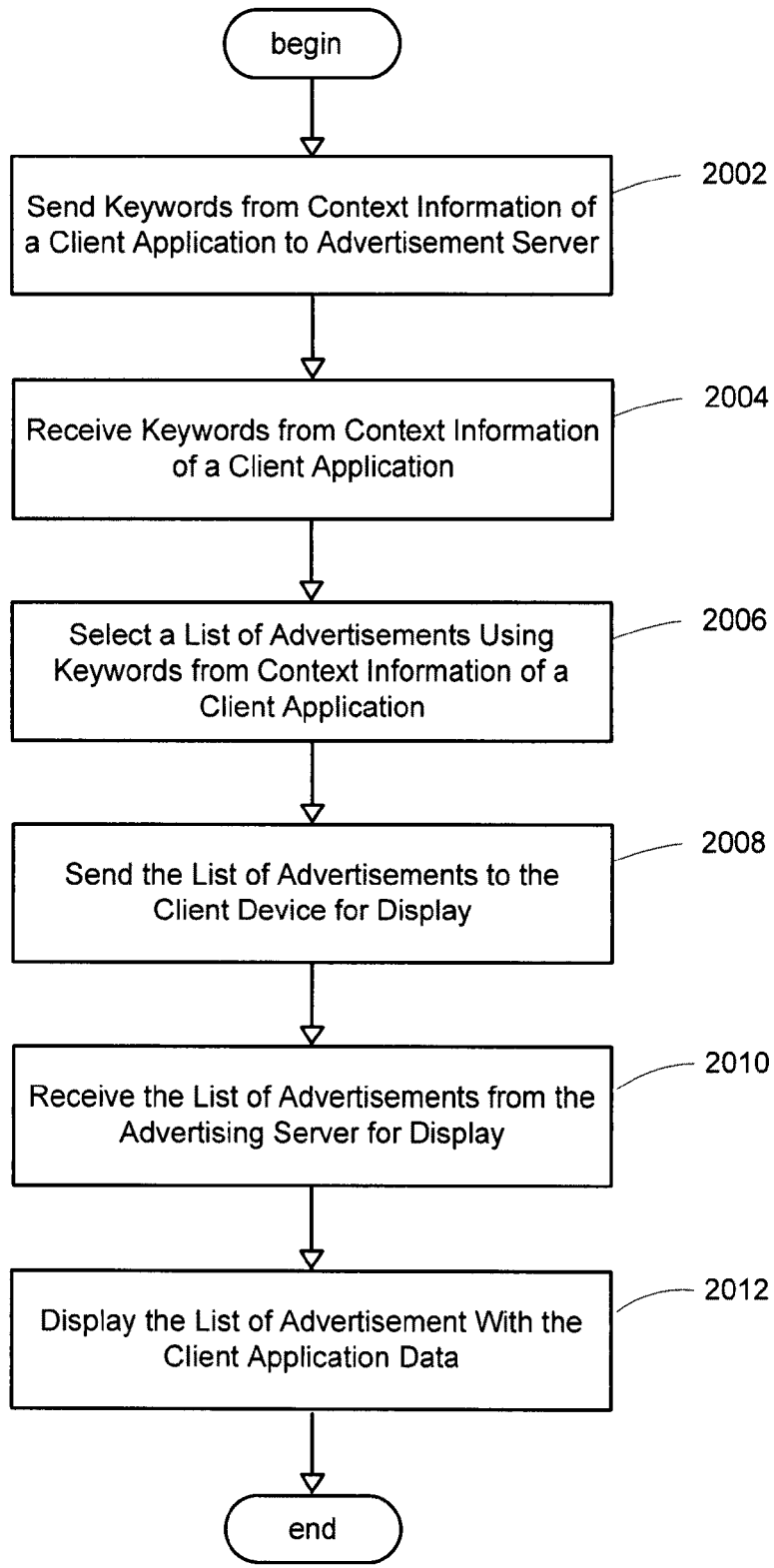
FIG. 20 is a flowchart for generally representing the steps undertaken in one embodiment for using context information for online advertising applications, in accordance with an aspect of the present invention.

FIG. 20 presents a flowchart for generally representing the steps undertaken in one embodiment for using context information for online advertising applications. At step 2002, one or more keywords from context information of an application executing on a client device may be sent to an advertisement server. In various embodiments, the keywords may be entered by a user as tags for the application content, or the keywords may alternatively be extracted from the content of the application. The keywords from context information of an application may be received at step 2004 by an advertisement server. In an embodiment, a server query handler executing on the advertisement server may receive the keywords as a query sent from a query handler executing on a client device.

At step 2006, a list of advertisements may be selected using the keywords from the context information of the application. In an embodiment, advertisements may be selected by an advertisement selector using any well-known online keyword auction techniques where advertisers may bid on keywords for selection of their advertisements to be included in a list of advertisements chosen for display. After selecting the list of advertisements using the keywords, the list of advertisements may be sent at step 2008 to the client device for display. A client device may then receive the list of advertisements at step 2010 from the advertising server for display on the client device and the list of advertisement may be displayed at step 2012 on the client device along with the client application data.

In addition to using context information for online advertising applications, those skilled in the art will appreciate that other applications may use the context and related information saved along with the content of a web application document. For instance, a listing of relevant people included as elements of context information from a web application document may be generated along with their contact information and displayed by an application in a sidebar display on a client device.

Thus, the present invention may save and restore a web application document using a variety of devices and may capture context information relevant to the web application document. Advantageously, a user may specify a named folder on a web server for storing the web application document as easily as storing a file on a local hard drive. Additionally, a user may select the amount of context information to store about the web application document as well as specify keywords to be associated with the web application document. Importantly, user identities may be mapped to stored information to support such storage on the web, and may be authenticated in varying degrees to conform to the sensitivity of the information provided.

As can be seen from the foregoing detailed description, the present invention provides an improved system and method for providing web system services for storing data and context information of client applications on the web. Such a system and method may implement a data and storage model that may accommodate an otherwise varied set of document types and configurations by providing consistent services across an arbitrary set of applications. The web system services described may allow the web to provide primary storage for information rather than client hard drives. In addition to storing content for users on the web, enhanced context and related information may be saved along with the content. Furthermore, view information may be saved that provides information about the organization structure determining presentation to user. Moreover, information stored using the web systems services may be made generally available for retrieval by web applications other than those that stored the information. Furthermore, privacy controls may additionally be implemented for sharing web application documents with other users. As a result, the system and method provide significant advantages and benefits needed in contemporary computing and in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for processing application data for storage on a network, said computer system comprising:

a web system services interface, for invoking web system services to support web applications to operate over the web using different devices that store data and context of web applications as a web application document onto a web server;

an application operating on a client device connected to the network for processing application data;

a memory device storing a web application document having stored therein:
  view information providing information about an organization structure determining presentation of the application to a user, wherein said view information is used to launch the application corresponding to an information type;
  content from the application, wherein the content is formatted differently for each client device; and
  context information, wherein each item of the context information belongs to a predefined context type for said application and wherein said context information has a scope declared according to a predefined schema;
wherein the content and context information is input by at least one of a plurality of applications operating on at least one of a plurality of client devices;
wherein each client device is associated with a single registered user authenticated via a web application server;
wherein said single registered user is the user of each client device;
a content loader operably coupled to the application operating on the client device for loading content and context information from the web application document as the application data processed by the application;
an input/output subsystem receiving a request to restore content and context information of a web application document from a client device different from the client device that stored the web application document; and
a processor device operably coupled with the memory performing steps of:
loading the view information from the web application document on the client device, wherein the view information provides information about an organization structure determining presentation of the application to the single registered user;
loading the context information from the web application document on the client device;
loading the content from the web application document as the application data processed by the application operating on the client device;
launching the application according to the view information; and
processing the application operating on the client device.

2. The system of claim 1 further comprising a web application server operably coupled to the application for providing web system services for restoring the content and context information of the web application document on the client device, wherein said client device is different from the client device that stored the web application document.

3. The system of claim 2 further comprising a storage operably coupled to the web system services for storing the web application document, said storage accessible by the client device over the network.

4. The system of claim 2 wherein the view information is stored as a set of strings within an item in a container.

5. A computer-readable storage medium having computer-executable components comprising the system of claim 1.

6. A computer-implemented method for processing application data for storage on a network, comprising:
invoking web system services to support web applications to operate over the web using different devices that store data and context of web applications as a web application document onto a web server;
receiving a request to restore content and context information of a web application document on a client device, said web application document comprising:
  view information providing information about an organization structure determining presentation of an application to a user, wherein said view information is used to launch the application corresponding to an information type;
  content from the application; and
  context information, wherein each item of the context information belongs to a predefined context type for said application and wherein said context information has a scope declared according to a predefined schema;
wherein the content and context information is input by at least one of a plurality of applications operating on at least one of a plurality of client devices;
loading view information from the web application document on the client device, wherein the view information provides information about an organization structure determining presentation of the application to a user;
wherein said user is a single registered user authenticated via a web application server;
wherein said single registered user is the user of each client device;
loading the context information from the web application document on the client device;
loading the content from the web application document as the application data processed by the application operating on the client device, wherein the content is formatted differently for each client device;
launching the application according to the view information; and
processing the application operating on the client device.

7. The method of claim 6 further comprising parsing the web application document to determine the view information to load on the client device.

8. The method of claim 6 further comprising determining the view information to load on the client device from the web application document.

9. The method of claim 6 further comprising parsing the web application document to determine the content to load on the client device as the application data.

10. The method of claim 6 further comprising determining the content to load on the client device as the application data.

11. The method of claim 6 further comprising parsing the web application document to determine the context information to load on the client device.

12. The method of claim 6 further comprising determining the context information to load on the client device from the web application document.

13. The method of claim 6 wherein loading the content from the web application document comprises loading content components from a container representing the web application document.

14. The method of claim 6 wherein loading the context information from the web application document comprises loading context components from a container representing the web application document.

15. The method of claim 6 wherein receiving the request to restore content and context information of the web application document on the client device comprises receiving a request for performing a web system service for restoring the web application document from a web server.

16. The method of claim 6 further comprising storing the application data processed by the application operating on the client device as a modified web application document on the web server.

* * * * *